(12) United States Patent
Wilberding et al.

(10) Patent No.: US 10,712,997 B2
(45) Date of Patent: Jul. 14, 2020

(54) ROOM ASSOCIATION BASED ON NAME

(71) Applicant: Sonos, Inc., Santa Barbara, CA (US)

(72) Inventors: Dayn Wilberding, Santa Barbara, CA (US); Chris Bierbower, Portland, OR (US); Mish Fabok, Portland, OR (US); Jake Szymanski, Santa Barbara, CA (US); JD Hooge, Portland, OR (US); Tristan Wood, Portland, OR (US); Chip Truex, Portland, OR (US); Christopher Butts, Evanston, IL (US); Paul Bates, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 80 days.

(21) Appl. No.: 15/682,506

(22) Filed: Aug. 21, 2017

(65) Prior Publication Data

US 2018/0107446 A1 Apr. 19, 2018

Related U.S. Application Data

(60) Provisional application No. 62/409,358, filed on Oct. 17, 2016.

(51) Int. Cl.
*G06F 17/00* (2019.01)
*G06F 3/16* (2006.01)
(Continued)

(52) U.S. Cl.
CPC .............. *G06F 3/165* (2013.01); *G05B 15/02* (2013.01); *H04N 21/43615* (2013.01);
(Continued)

(58) Field of Classification Search
CPC .. G06F 3/165; G05B 15/02; H04N 21/43615; H04N 21/4524; H04N 21/458;
(Continued)

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Joseph Saunders, Jr.
(74) *Attorney, Agent, or Firm* — McDonnell Boehnen Hulbert & Berghoff LLP

(57) ABSTRACT

Systems and methods for use in a media playback system comprising one or more playback devices are disclosed, where a playback device has a corresponding first set of device attributes used by a first controller application. The methods include: (i) identifying a second set of device attributes used by a second controller application to control the playback device, (ii) selecting a second device attribute for the playback device from the second set of device attributes based at least in part on a first device attribute; (iii) storing the selected second device attribute in the first set of device attributes; and (iv) controlling at least one function of the playback device using the selected second device attribute.

21 Claims, 29 Drawing Sheets

(51) Int. Cl.
*G05B 15/02* (2006.01)
*H04R 3/12* (2006.01)
*H04R 27/00* (2006.01)
*H04N 21/81* (2011.01)
*H04N 21/45* (2011.01)
*H04N 21/458* (2011.01)
*H04N 21/436* (2011.01)

(52) U.S. Cl.
CPC ....... *H04N 21/458* (2013.01); *H04N 21/4524* (2013.01); *H04N 21/8113* (2013.01); *H04R 3/12* (2013.01); *H04R 27/00* (2013.01); *H04R 2227/005* (2013.01)

(58) Field of Classification Search
CPC ...... H04N 21/8113; H04R 3/12; H04R 27/00; H04R 2227/005
See application file for complete search history.

(56) References Cited

U.S. PATENT DOCUMENTS

| | | | |
|---|---|---|---|
| 5,923,902 A | 7/1999 | Inagaki | |
| 6,032,202 A * | 2/2000 | Lea | G06F 9/4411 710/3 |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington et al. | |
| 8,483,853 B1 | 7/2013 | Lambourne | |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty | |
| 2003/0234737 A1 * | 12/2003 | Nelson | G08C 19/28 341/176 |
| 2004/0024478 A1 | 2/2004 | Hans et al. | |
| 2007/0142944 A1 | 6/2007 | Goldberg et al. | |
| 2012/0227076 A1 * | 9/2012 | McCoy | H04N 21/2387 725/110 |
| 2014/0344689 A1 * | 11/2014 | Scott | G06F 3/0484 715/716 |
| 2015/0019553 A1 * | 1/2015 | Shaashua | H04W 4/70 707/737 |
| 2017/0064550 A1 * | 3/2017 | Sundaresan | H04W 12/06 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

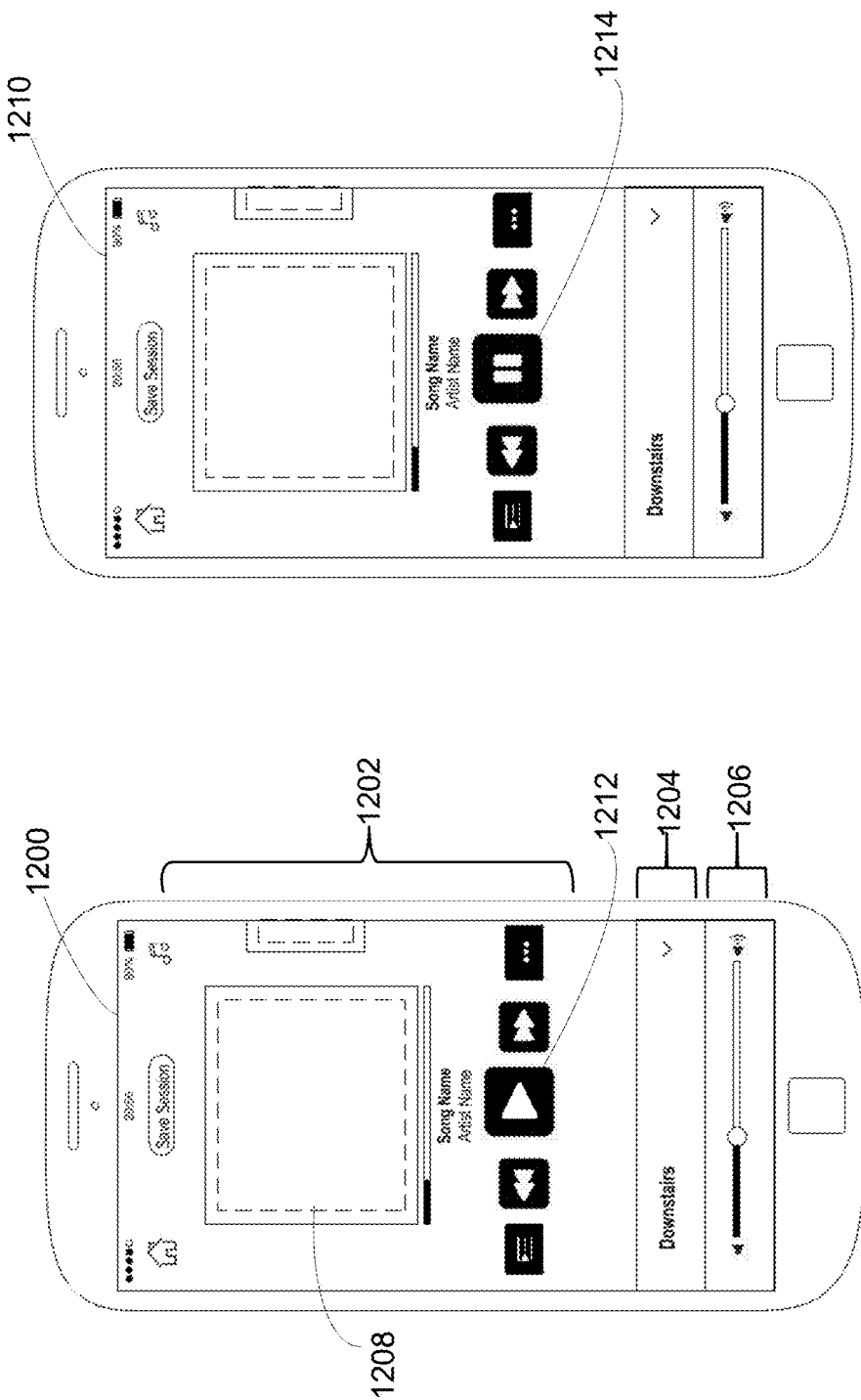

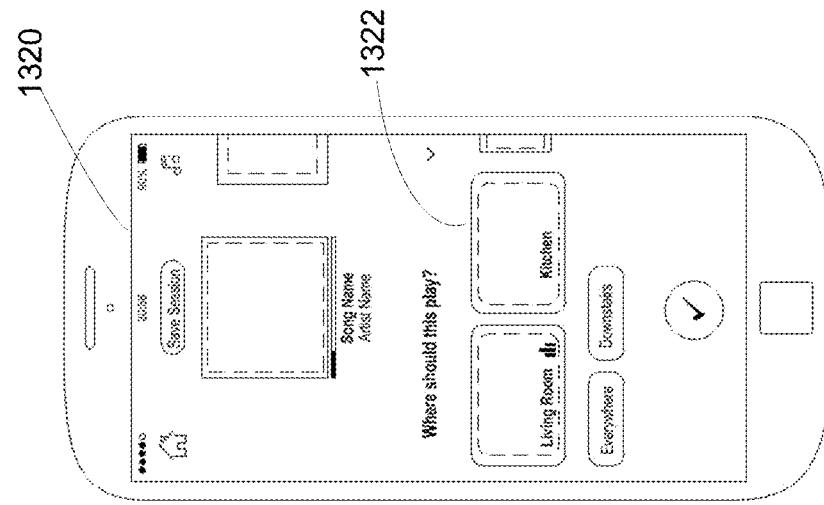
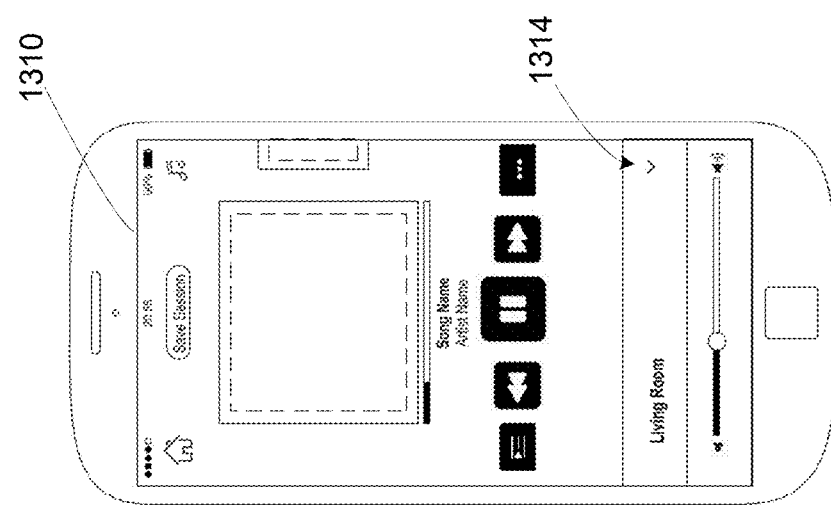
FIGURE 13A
FIGURE 13B

ROOM ASSOCIATION BASED ON NAME

CROSS REFERENCE TO RELATED APPLICATIONS

The present application claims priority to U.S. Provisional App. No. 62/409,358 titled "Music Session Interface," filed on Oct. 17, 2016. The entire contents of the 62/409,358 application are incorporated herein by reference. The present application additionally incorporates herein by reference the entire contents of (i) U.S. application Ser. No. 13/656,050, filed Oct. 19, 2012, titled "Systems And Methods For Wireless Music Playback"; (ii) U.S. application Ser. No. 11/853,790, filed Sep. 11, 2007, titled "Controlling And Manipulating Groupings In A Multi-Zone Media System"; (iii) U.S. application Ser. No. 12/035,112, filed Sep. 11, 2007, titled "Method And Apparatus For Controlling Multimedia Players In A Multi-Zone System"; (iv) U.S. application Ser. No. 13/892,230, filed Sep. 11, 2007, titled "Method And Apparatus For Controlling Multimedia Players In A Multi-Zone System"; (v) U.S. application Ser. No. 14/737,199, filed Jun. 11, 2015, titled "Method And Apparatus For Controlling Multimedia Players In A Multi-Zone System."; (vi) U.S. application Ser. No. 14/300,564, filed May 22, 2015, titled "Providing Media Items From Playback History"; and U.S. application Ser. No. 13/338,724, filed Dec. 28, 2011, titled "Methods And Systems To Select An Audio Track."

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software controller application installed on a phone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

SUMMARY

The present application discloses systems and methods for use in a media playback system comprising one or more playback devices, where a playback device has a corresponding first set of device attributes. In some embodiments, the first set of device attributes are used by a first controller application to control one or more of the playback devices in the media playback system. In some embodiments, the first set of device attributes are used by a cloud server (or other computing device or system) to control one or more of the playback devices in the media playback system. In still further embodiments, the first set of device attributes are used by an application programming interface (API) associated with one or more of a controller application and/or a cloud computing server (or other computing device or system) to control one or more playback devices of the media playback system.

In some embodiments, the systems and methods include: (i) identifying a second set of device attributes associated with the playback device, (ii) selecting a second device attribute for the playback device from the second set of device attributes based at least in part on a first device attribute; (iii) storing the selected second device attribute in the first set of device attributes; and (iv) controlling at least one function of the playback device using the selected second device attribute. In some embodiments, one or more attributes of the second set of device attributes are used by a second controller application to control one or more playback devices of the media playback system. In some embodiments, the second set of device attributes are used by a cloud server (or other computing device or system) to control one or more of the playback devices in the media playback system. In still further embodiments, the second set of device attributes are used by an application programming interface (API) associated with one or more of a controller application and/or a cloud computing server (or other computing device or system) to control one or more playback devices of the media playback system.

In some embodiments, the first device attribute comprises one of or more of (i) a player name for the playback device, (ii) a player type of the playback device, (ii) a player icon for the playback device, (iii) a player configuration for the playback device, (iv) a zone name for a zone associated with the playback device (e.g., the "downstairs zone" or "bedroom zone"), (v) a session name for a session associated with the playback device, (v) a room name associated with the playback device (e.g., a room (for example, "John's bedroom") where the playback device is located), (vi) a room type associated with the playback device (e.g., a type of room (for example, "bedroom") where the playback device is located), (vii) an area name associated with the playback device (e.g., an area where the playback device is located, for example, "downstairs" or "patio"). In some embodiments, the second set of device attributes comprises one of or more of (i) a player name for the playback device, (ii) a player type of the playback device, (ii) a player icon for the playback device, (iii) a player configuration for the playback device, (iv) a zone name for a zone associated with the playback device (e.g., the "downstairs zone" or "bedroom zone"), (v) a session name for a session associated with the playback device, (v) a room name associated with the playback device (e.g., a room (for example, "John's bedroom") where the playback device is located), (vi) a room type associated with the playback device (e.g., a type of room (for example, "bedroom") where the playback device is located), (vii) an area name associated with the playback device (e.g., an area where the playback device is located, for example, "downstairs", "patio", or "downstairs+patio"). The first and second sets of device attributes could include fewer, additional, and/or different attributes than the ones listed above.

In some example embodiments, selecting a second device attribute based at least in part on the first device attribute comprises selecting at least one attribute from the second set of attributes based on at least one attribute from the first set of attributes. Some examples include selecting at least one of a room type identifier from the set of room type identifiers, room name identifier from the set of room identifiers, an area name identifier from the set of area identifiers, and/or a zone name identifier from the set of zone identifiers based at least in part on one or more of the player name, the player type, the player icon, the player configuration, the zone name for a zone associated with the playback device, and the session name for a session associated with the playback device. In operation, any one or more attributes from the second set of attributes can be selected for an individual playback device or group of playback devices based on any one or more attributes from the first set of attributes.

In still further embodiments, the first set of attributes and the second set of attributes may both be used by a single controller application. For example, the first set of attributes may include player names, and the second set of attributes may include room names, area names, zone names, and/or other attributes. In such embodiments, the controller application selects a second attribute based at least in part on a first attribute. In some examples, the controller application selects a room name for a playback device based on a player name of the playback device. In other examples, the controller application selects a room name and an area name for a playback device based at least in part on the player name and player type. As mentioned previously, any one or more attributes from the second set of attributes can be selected for an individual playback device or group of playback devices based on any one or more attributes from the first set of attributes These and other aspects of the disclosed systems and methods are shown and described in more detail herein with reference to the accompanying figures.

BRIEF DESCRIPTION OF THE DRAWINGS

Features, aspects, and advantages of the presently disclosed technology may be better understood with regard to the following description, appended claims, and accompanying drawings where:

FIGS. 12A-12D show example operations to create a new music session, according to an example implementation; and FIGS. 13A-13D show example operations to modify zone selection for a music session, according to an example implementation.

Figure 1:
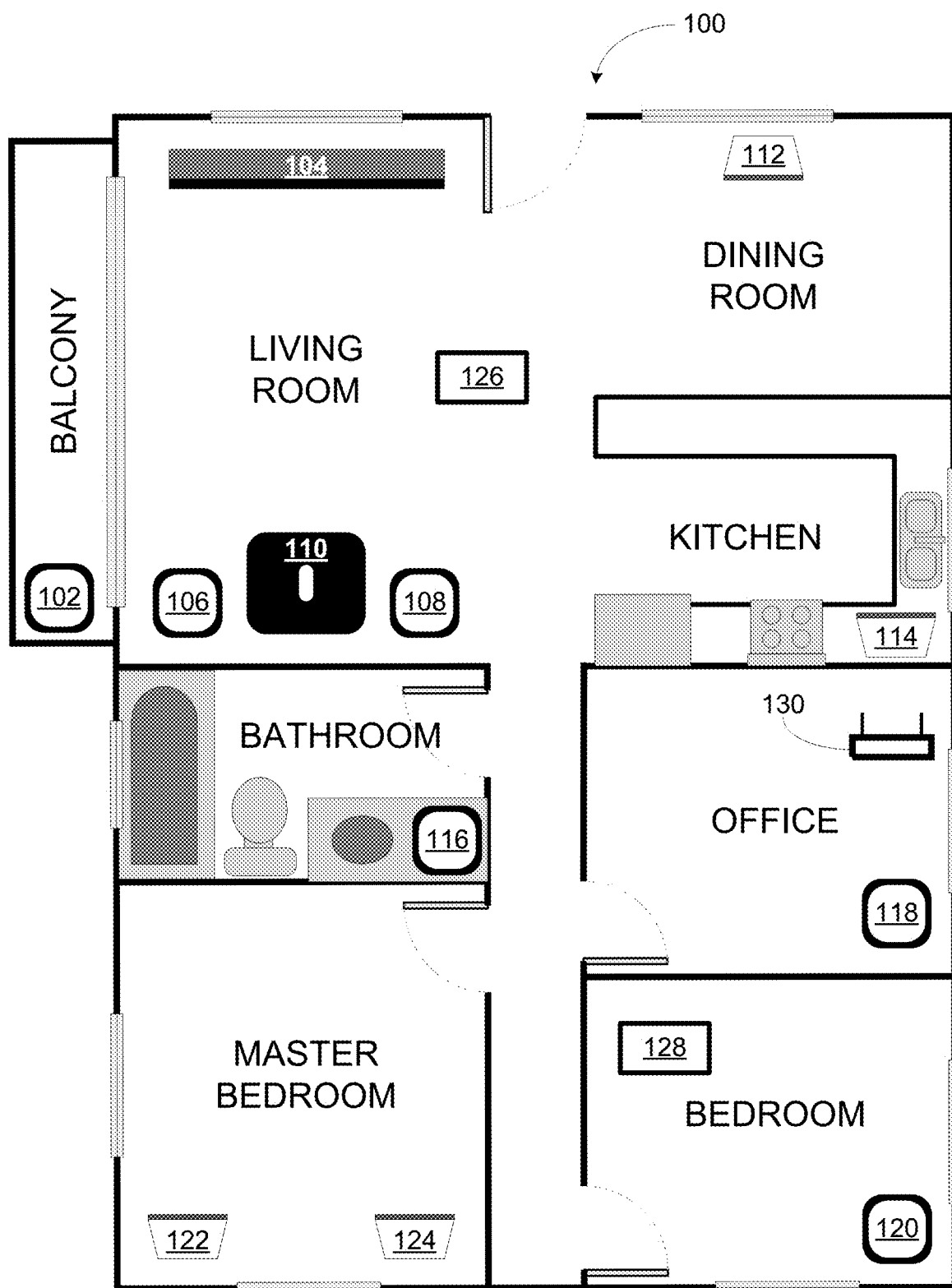
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In an example use case of a media playback system, a user may select media (e.g., an album, playlist, individual track(s), among other examples) for playback on the media playback system, perhaps using a control device (e.g., a mobile computing device or tablet). Some media playback systems may include multiple playback devices, which may play back media individually or as a group (possibly synchronously, without audible echoes or glitches). In some implementations, a media playback system may include multiple listening "zones" that include respective playback devices.

A "session" may describe an instance of a particular set of media (e.g., an album, a playlist, or set of queued media items) being played back on a particular set of playback devices (e.g., on a playback device of particular listening zone or by a group of listening zones), perhaps according to one or more particular settings. Example implementations described herein may facilitate creating new sessions, selecting a pre-existing session, modifying a listening zone associated with a session, or changing a playback setting (e.g., play, pause, next track, previous track, playback volume, and EQ settings, among others) associated with a session.

Some implementations described herein may involve, inter alia, a control device (e.g., a mobile computing device or tablet computer) displaying one or more graphical interfaces to facilitate a music session. In addition to media item(s) for playback, a music session may, for example, include volume control settings, equalization settings, playback control settings, room or zone settings, and the like. The control device may display such music sessions in a manner that may simplify and improve listening experience.

In some implementations contemplated herein, the control device may cause a graphical display to display one or more interfaces to prepare for a music session. Such interfaces may include various graphical elements such as text, icons, and the like to indicate information related to music sessions and/or for creating and modifying music sessions.

In some examples, the control device may cause the graphical display to display a "home screen" interface. The home screen interface may include, for example, a selectable control to create a new music session, a first region to select an active session (e.g., a session that is currently being used), and a second region to select a recent session (possibly from among several recent sessions).

In other examples, the control device may cause the graphical display to display a "music browsing" interface. The music browsing interface may include, for example, a search tool to facilitate search for a particular artist, song, album, playlist, station, genre, composer, podcast, and the like, which may be used to select media for playback (e.g., in a given session). Additionally, the music browsing interface may include a browsing tool to search for a particular song from one or more audio sources. Audio sources may include one or more media service providers (e.g., Pandora® Radio, Spotify®, Slacker®, Radio, Google Play™, iTunes Radio), as well as local and/or remote audio sources that may be within the control device, or within any other device described herein.

In other examples contemplated herein, the control device may cause the graphical display to display one or more interfaces for a selected music session. For example, the control device may cause the graphical display to display a "now playing" interface. The now playing interface may include graphical elements corresponding to an audio track being played, one or more playback controls, and an indictor to modify one or more zones (e.g., living room, bathroom), or zone scenes or "areas" (e.g., downstairs, upstairs, basement, possibly including multiple zones).

In further embodiments contemplated herein, the control device may cause the graphical display to display one or more interfaces to select one or more zones or zone scenes to play back audio in synchrony with one or more selected listening zones or zone scenes. For example, the control device may cause the graphical display to display a "rooms controller" interface. The rooms controller interface may include graphical elements corresponding to an audio track being played, and one or more indicators corresponding to a particular zone or zone scene.

In one aspect, a method is provided to cause the graphical display to display the above interfaces. In another aspect, a device is provided. The device includes a network interface, at least one processor, data storage, and program logic stored in the data storage and executable by the at least one processor to perform operations. The operations may include displaying (i) one or more interfaces to prepare for a music session, (ii) one or more interfaces for the selected music session, and (iii) one or more interfaces to select one or more zones or zone scenes.

In yet another aspect, tangible, non-transitory computer readable media is provided. The tangible, non-transitory computer readable media has stored thereon instructions executable by a control device to cause the control device to perform operations described above.

It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
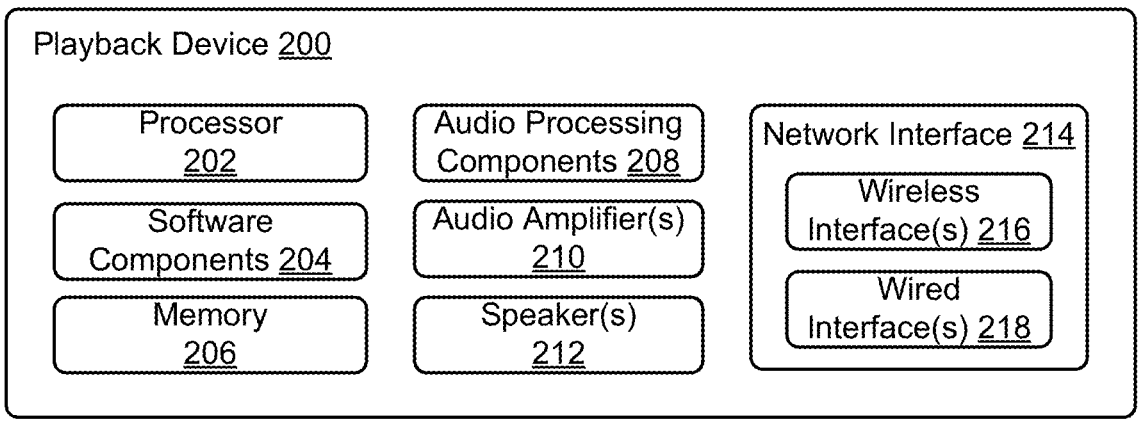
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
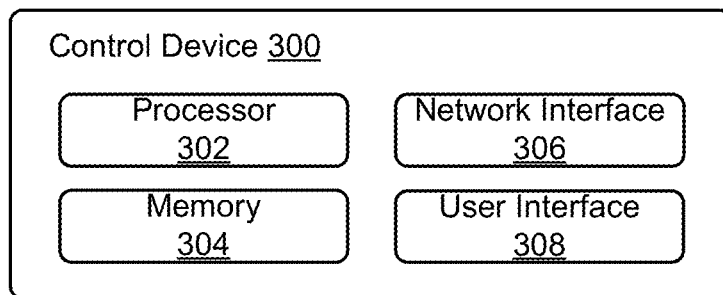
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other mobile computing device, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data representing information (e.g., a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
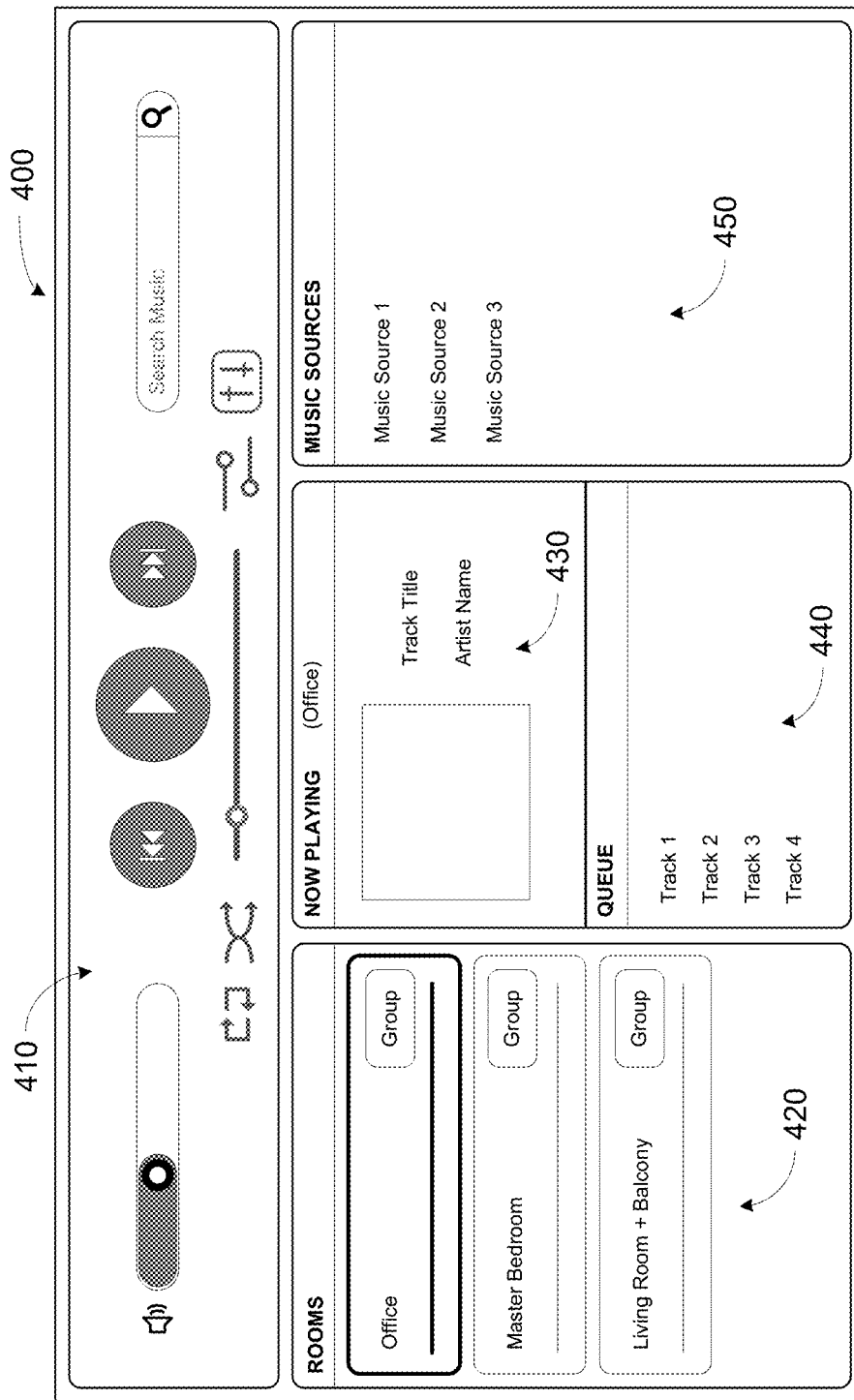
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Networked Devices

In some embodiments, a networked microphone device (NMD) that is communicatively coupled to the playback device 200 or other devices within the media playback system may be configured to provide an audio playback experience based on voice control. In one example, one or more computing devices may be devices configured primarily for audio detection. In another example, one or more of the NMDs may be components of devices having various primary utilities. For instance, as discussed above in connection to FIGS. 2 and 3, one or more of NMDs may be the microphone(s) 220 of playback device 200 or the microphone(s) 310 of network device 300. Further, in some cases, one or more of NMDs may be the playback device 200 or network device 300.

In operation, a given NMD may be configured to receive voice inputs to control a playback device, such as playback device 200. The available control commands may include any media playback system controls previously discussed, such as playback volume control, playback transport controls, music source selection, and grouping, among other possibilities. In one instance, a given NMD may receive a voice input to control one or more playback devices. In response to receiving the voice input, the given NMD may transmit, via a network interface, the voice input to the media playback system for processing.

For instance, if the text command is "Play 'Track 1' by 'Artist 1' from 'Streaming Service 1' in 'Zone 1'," The media playback system may identify (i) a URL for "Track 1" by "Artist 1" available from "Streaming Service 1," and (ii) at least one playback device in "Zone 1." Upon identifying the URL and one or more playback devices, the media playback system to the one or more playback devices, the identified URL for playback. One or both playback devices may responsively retrieve audio content according to the received URL, and begin playing "Track 1" by "Artist 1" from "Streaming Service 1."

III. Example Techniques to Facilitate Music Sessions

Figure 5:
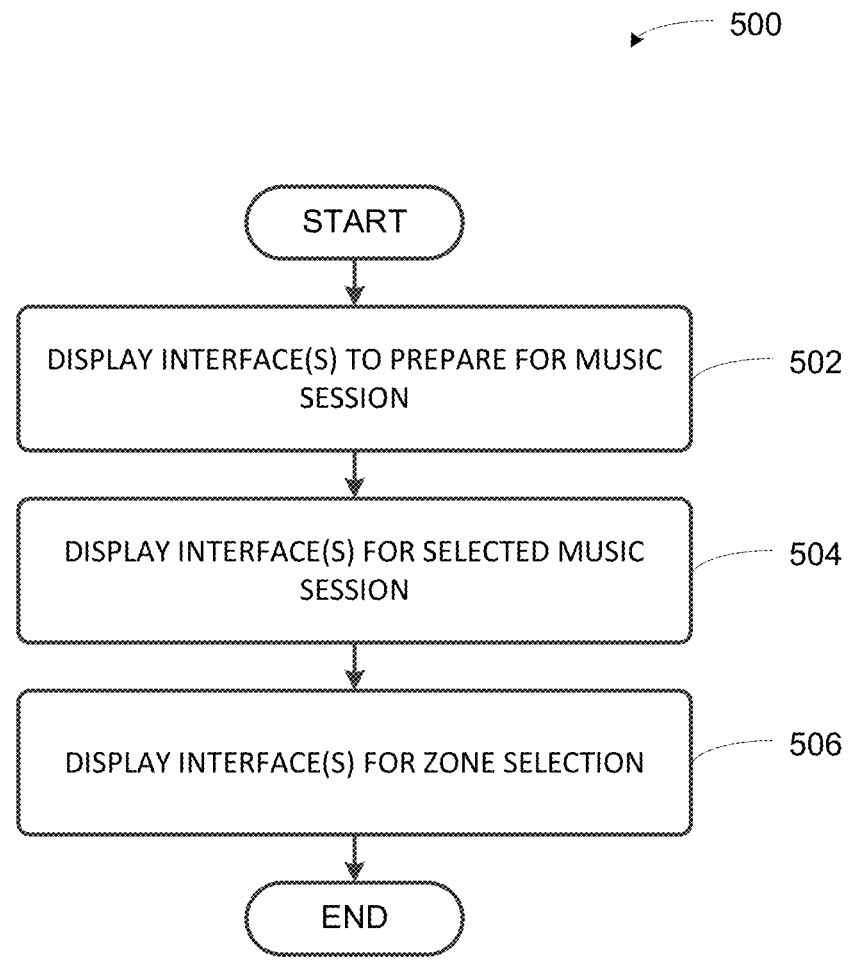
FIG. 5 shows an example flow diagram to facilitate a music session using a control device.

As noted above, techniques described herein may facilitate music sessions. FIG. 5 illustrates an example implementation 500 to use a control device to facilitate music sessions by causing a graphical display to display one or more interfaces.

Implementation 500 shown in FIG. 5 present embodiments that can be implemented within an operating environment including, for example, the media playback system 100 of FIG. 1, one or more of the playback device 200 of FIG. 2, or one or more of the control device 300 of FIG. 3. Further, operations illustrated by way of example as being performed by a media playback system can be performed by any suitable device, such as a playback device or a control device of a media playback system. Implementation 500 may include one or more operations, functions, or actions as illustrated by one or more of blocks shown in FIG. 5. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

a. Display Interface(s) to Prepare for Music Session

At block 502, implementation 500 involves displaying one or more interfaces to prepare for a music session. For instance, a control device, such as control device 126 of media playback system 100, may cause a graphical display to display an interface (e.g., control interface 400 of FIG. 4), that includes one or more interfaces to prepare for the music session.

As noted above, a music session may, for example, define one or more media items (e.g., artist, album, genre, title, etc.), volume control settings, equalization settings, playback control settings, room or zone settings, and the like during the session. The control device, one or more playback devices (e.g., playback device 200), or the media playback system may store one or more music sessions, including one or more of the settings or information described above.

Figure 6:
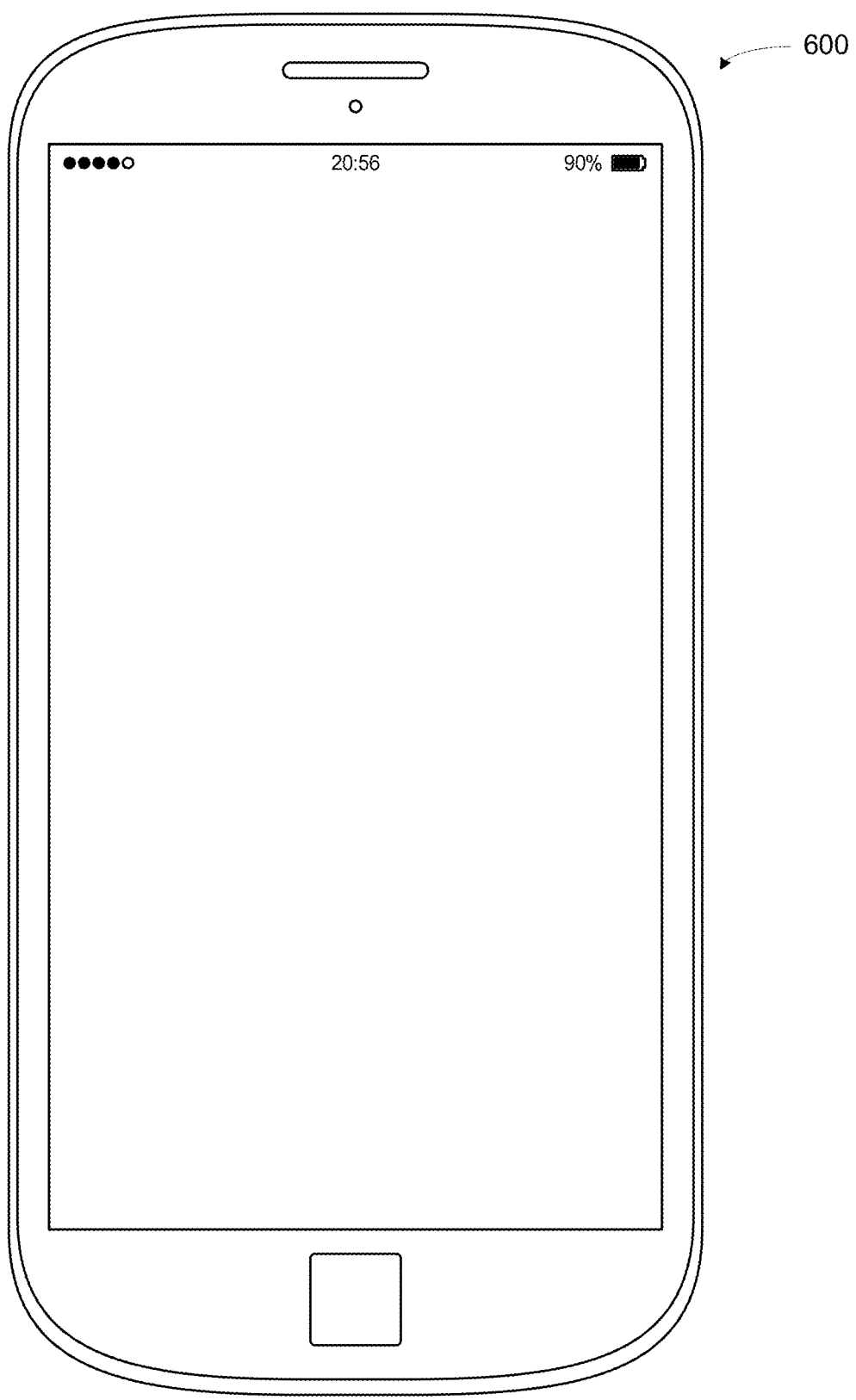
FIG. 6 shows an example control device.

FIG. 6 depicts an example control device 600 (e.g., a mobile computing device) that includes one or more processors, a tangible computer-readable memory, a network interface, and a display. Control device 600 might be an example implementation of control device 126 or 128 of FIG. 1, or control device 300 of FIG. 3, or other control devices described herein. By way of example, reference will be made to control device 600 and certain control interfaces, prompts, and other graphical elements that control device 600 may display. Within examples, such interfaces and elements may be displayed via any suitable control device, such as a mobile computing device, tablet computer, laptop or desktop computer, personal media player, or a remote control device.

Figure 7A:
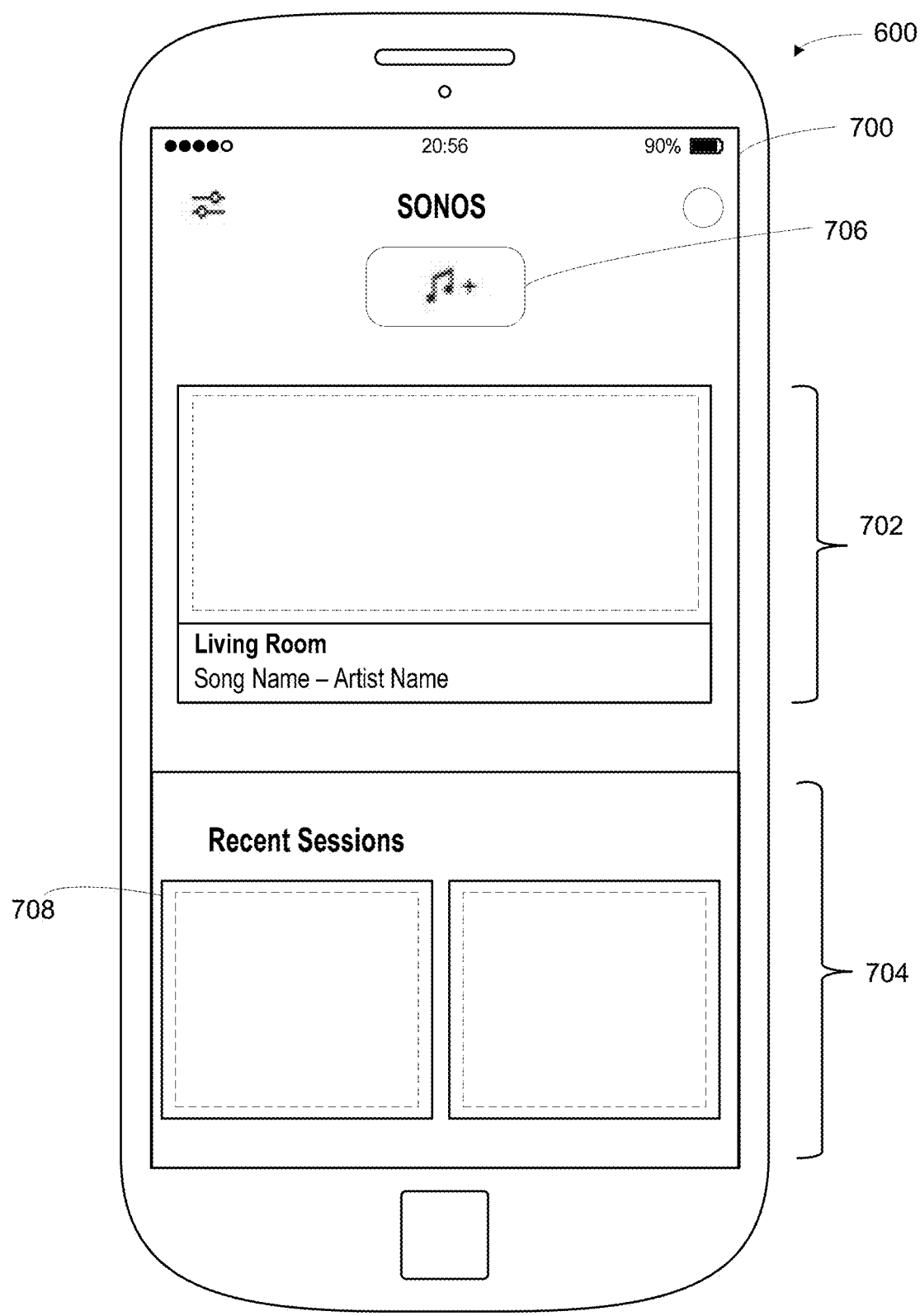
FIGS. 7A-F show a control device that is displaying an example control interface, according to an example implementation.
Figure 7B:
Figure 7C:
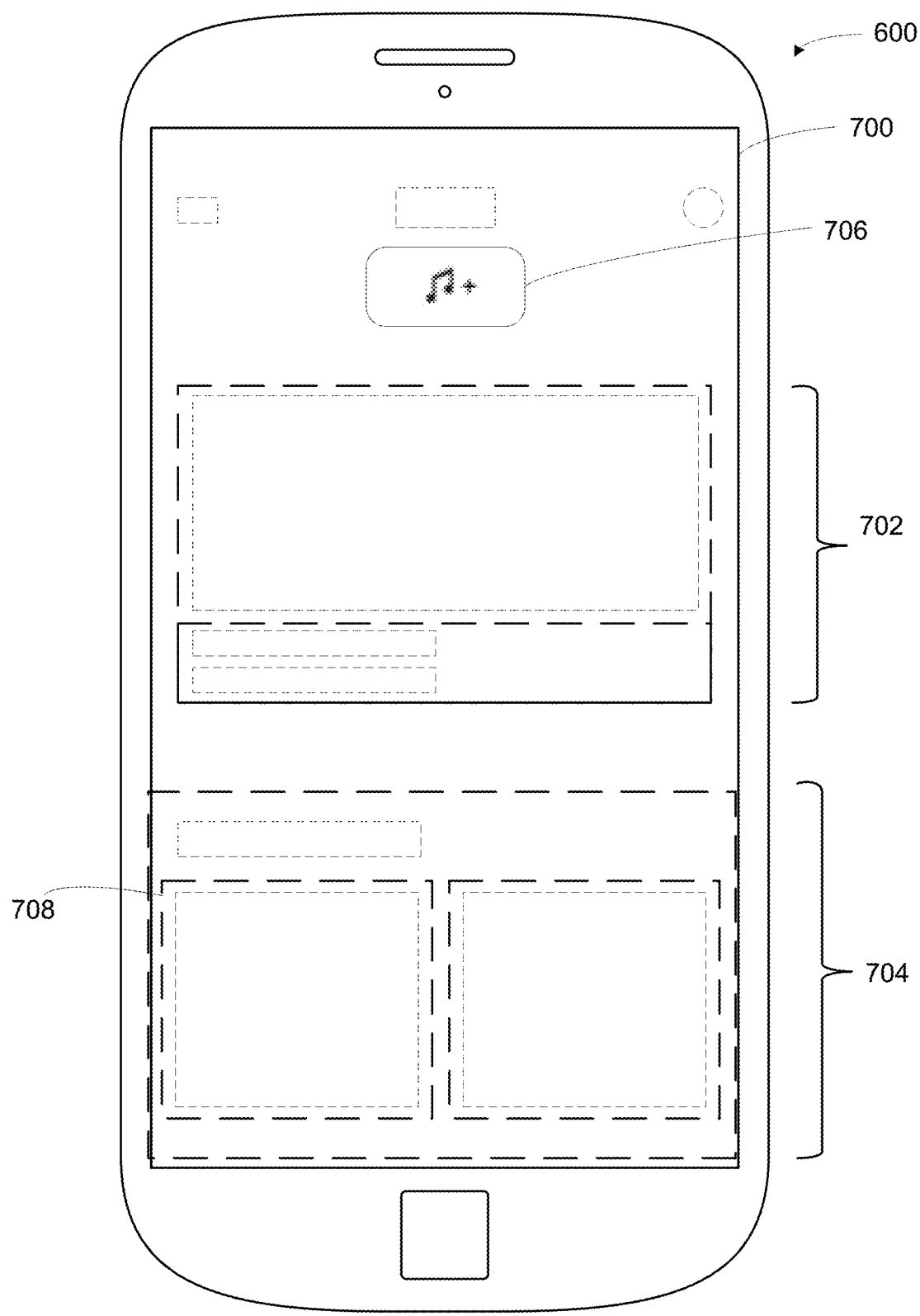
Figure 7D:
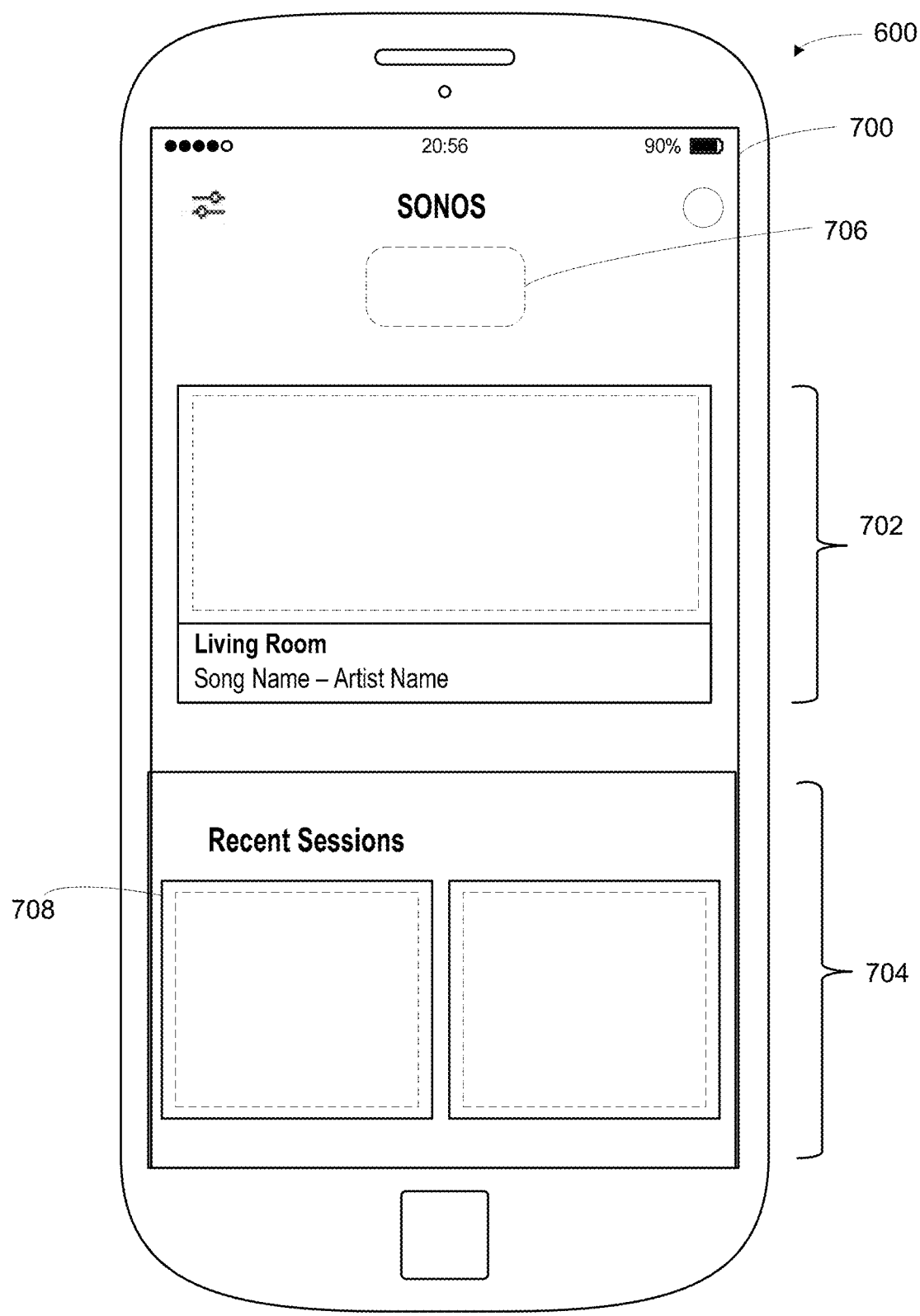
Figure 7E:
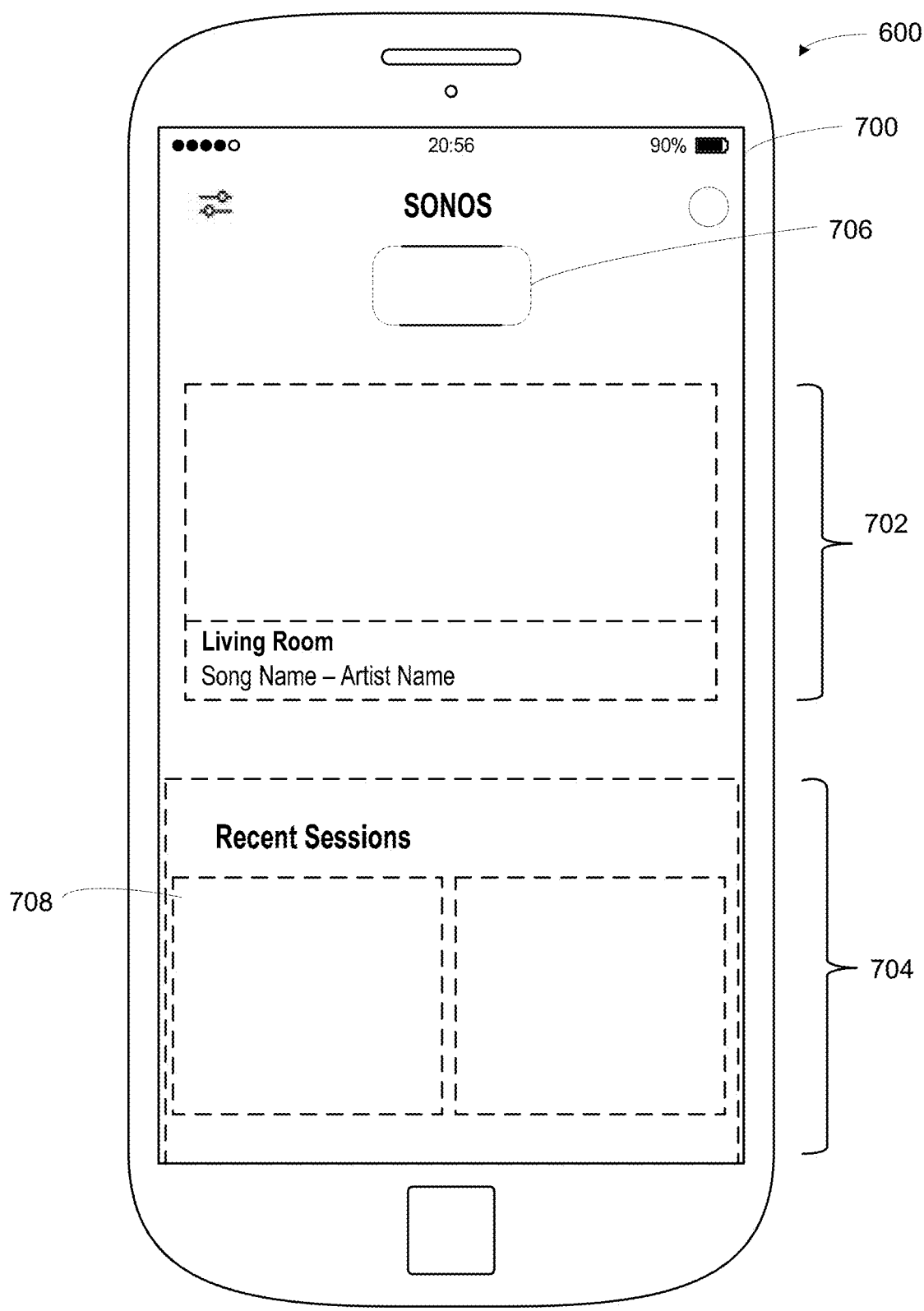
Figure 7F:
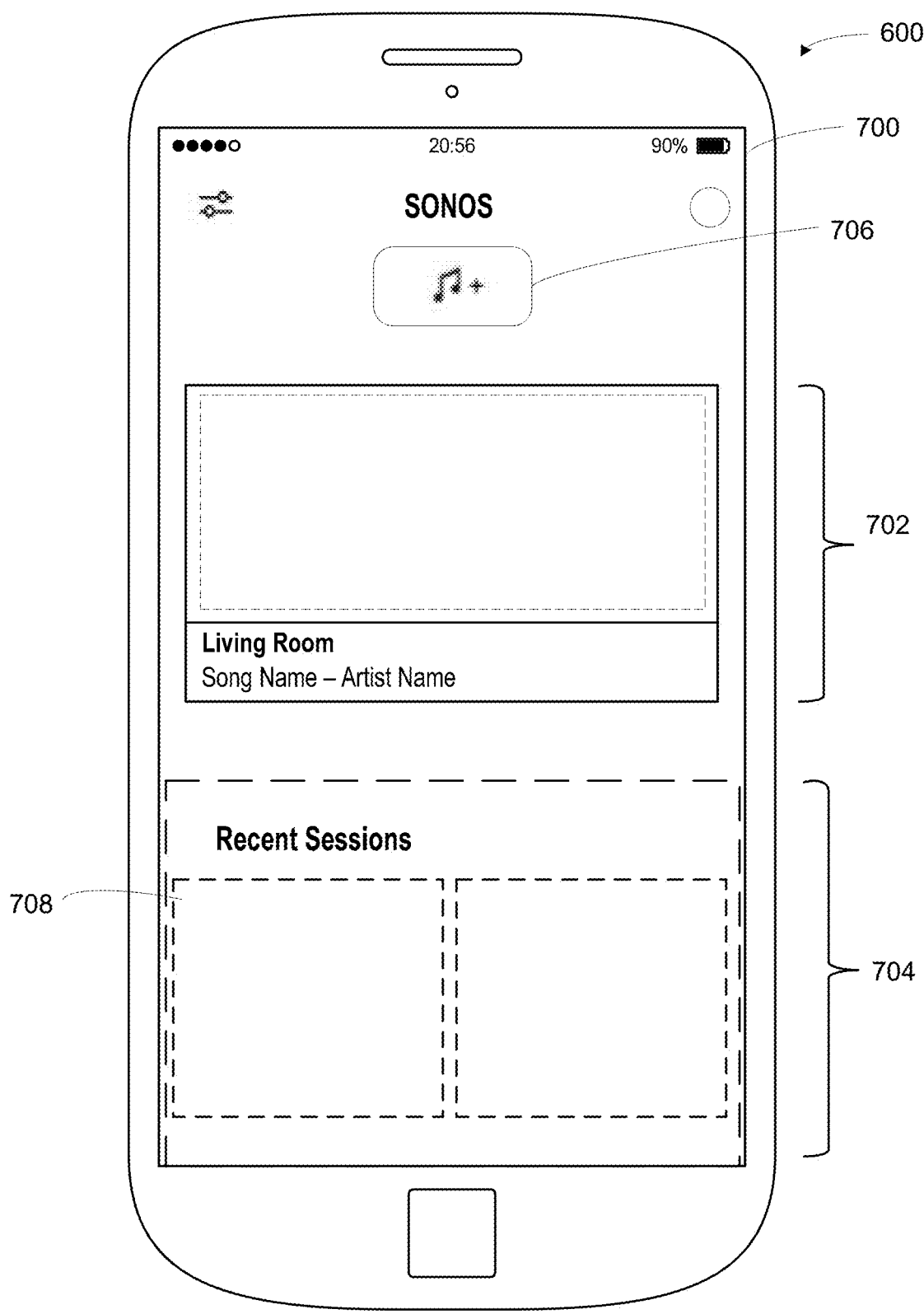
Figure 8:
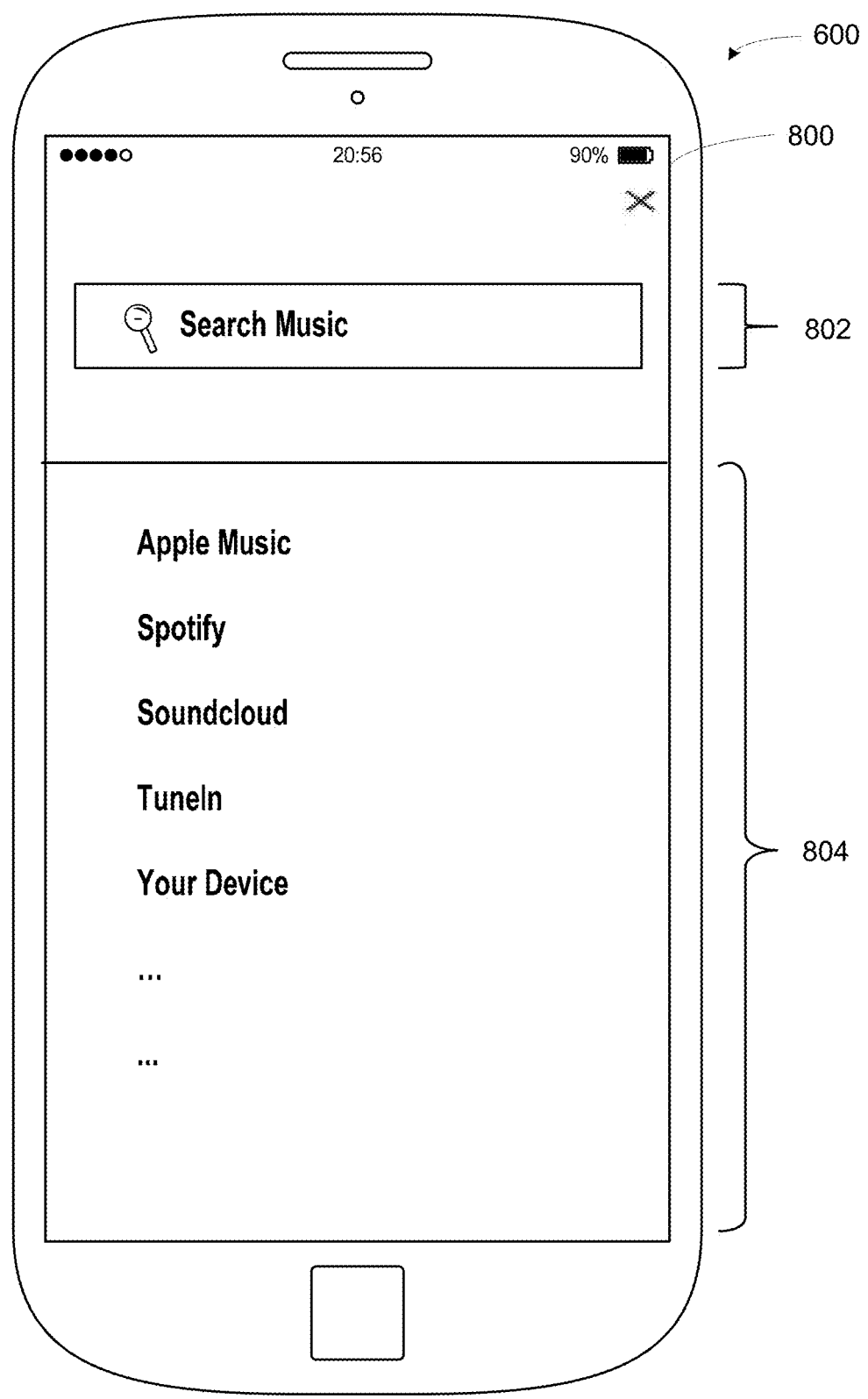
FIG. 8 shows a control device that is displaying another example control interface, according to an example implementation.

FIG. 7A-F, and FIG. 8 illustrate example control interfaces to prepare for a music session. In FIG. 7A, control device 600 displays an example control interface 700, which includes a new session indicator 706, first display region 702, and a second display region 704. FIG. 7B illustrates an example embodiment of control interface 700 in FIG. 7A. FIGS. 7C, 7D, 7E, and 7F illustrate other example embodiments of control interface 700 in FIG. 7A. Control interface 700 may be referred to as the "home screen" interface. FIG. 8 illustrates an example music browsing interface by which media for playback during a session may be searched or browsed.

Referring to FIG. 7A, the first display region 702 includes graphical elements representing one or more music sessions that are currently active in one or more or zones in a household. Additionally, first display region 702 may include graphical elements corresponding to the audio track(s) that are currently being played in respective music sessions. For instance, as shown, first display region 702 displays a music session that is currently active in the living room. First display region 702 also includes the song title and artist name of the audio track that is currently being playing in the living room music session. Alternative display regions contemplated herein may include additional or fewer items of metadata corresponding to the media being played back in the active music session.

In some instances, active sessions of a media playback system may include one or more sessions from one or more accounts corresponding to the media playback system within the household. Users of a media playback system (e.g., members of a household) may correlate respective accounts of the media playback system with control devices. For instance, a given user may register their user account with their personal mobile computing device (e.g., tablet, and/or laptop). Sessions created via these devices may be associated with that user's account. Some control devices may be shared (e.g., a family desktop computer) and, as such, the user account associated with that control device may depend upon which user is logged onto that control device at any given moment. A display region, such as display region 702, may include graphical elements indicating user account(s) that created the active session and/or are participating in that session (e.g., by viewing and/or modifying the session).

In FIG. 7A, example second display region 704 includes graphical elements representing one or more recent music sessions 708. Recent music sessions may include, for example, one or more prior music sessions corresponding to a given account corresponding to the control device and the media playback system within the household. For instance, a control device registered to a given user account may display in such a display region recent sessions that the user of the control device created or participated in. In some instances, the one or more recent music sessions 708 may include one or more saved music sessions corresponding to some or all accounts corresponding to the media playback system within the household. Additionally, the one or more recent music sessions may include music sessions affirmatively "saved" for later access by the user of the control device. Further, the one or more recent music sessions 708 may include music sessions suggested or recommended by a third party, such as a particular media service provider or other users, among other examples. In some instances, second display region 704 may be divided into multiple regions to categorize the one or more recent music sessions described above. For instance, a first region may display prior music sessions engaged in by the user of the control device, a second region may display saved music sessions affirmatively saved by the user, a third region may display prior music sessions created by other users of the media playback system, a fourth region may display music sessions recommended by a third party, and so on.

The one or more recent music sessions in the second display region 704 may be arranged in a particular order. For instance, the music sessions may be arranged by the most frequently selected music session, the most recently selected music session, by genre, by artist, by name of the music session, among other examples. In some instances, a particular music session may be moved (e.g., via dragging and dropping) in front of or behind another music session to rearrange the order in which the music sessions are displayed.

As noted above, control interface 700 also includes new session indicator 706. Upon selection of new session indicator 706, the control device may cause the graphical display to display another control interface to facilitate creation of a new session. For instance, the control device may cause the graphical display to display example control interface 800 in FIG. 8. Control interface 800 may be referred to as the "music browsing" interface and may facilitate selection of media items for the new session. In some instances, however, the control device may cause the graphical display to display control interface 800 before control interface 700.

As shown in FIG. 8, control interface 800 includes search tool 802 and browsing tool 804. Search tool 802 may be utilized to search for a particular artist, song, album, playlist, station, genre, composer, podcast, and the like. Browsing tool 804 may be utilized to select a particular song or media content from a given audio source among audio sources available to the media playback system. Example audio sources may include one or more media service providers (e.g., Apple Music®, Spotify®, Soundcloud®, TuneIn Radio® and the like), as well as local and remote audio sources within the control device or any other device described herein. In some instances, upon input of a search string (e.g., artist name), the display region corresponding to browsing tool 804 may be updated to display the search results and respective media sources corresponding to the search results.

b. Display Interface(s) for Selected Music Session

Referring back to FIG. 5, at block 504, implementation 500 involves displaying one or more interfaces for a selected music session. For instance, a control device, such as control device 126 of media playback system 100, may cause a graphical display to display an interface (e.g., control interface 400 of FIG. 4), that includes one or more interfaces for the selected music session.

In some instances, the control device may cause the graphical display to display one or more interfaces for the selected music session upon selection of an indicator (e.g., a selectable control) within control interface 700. For example, upon selection of one of the active sessions in the first display region 702, the control device may cause the graphical display to display one or more interfaces for the selected active music session. In another example, upon selection of one of the recent sessions in the second display region 704, the control device may cause the graphical display to display one or more interfaces for the selected recent music session.

Additionally or alternatively, the control device may cause the graphical display to display one or more interfaces for a new music session upon selection of an indicator within the control interface 800. For example, upon selection of a particular audio content searched for via the search tool 802 and/or browsing tool 804, the control device may cause the graphical display to display one or more interfaces for a new music session.

In other instances, the control device may cause the graphical display to display one or more interfaces for the selected music session upon initiation of the application, possibly without selection of an indicator or other control within control interfaces 700 and 800. For example, upon launching the application to listen to music, the control device (or any other device within the media playback system) may select a prior music session and the control device may cause the graphical display to display the selected music session, possibly without further input from the user to select that music session. Within examples, the control device may select a prior music session that was most recently selected or is most frequently selected. In further examples, the control device may select a prior music session that is most frequently selected at a particular time of day or month.

In another example, upon launching the application to listen to music, the control device may select an active music session within the household and the control device may cause the graphical display to display the selected music session, possibly without further input from the user to select that music session. In example operations, the control device may select an active music session corresponding to the kitchen upon detecting (via one or more sensors) that the control device is located in the kitchen. Alternatively, the control device may select an ongoing active music session corresponding to the kitchen upon relaunch of the application in response to determining that such music session was previously selected before relaunch of the application.

Figure 9A:
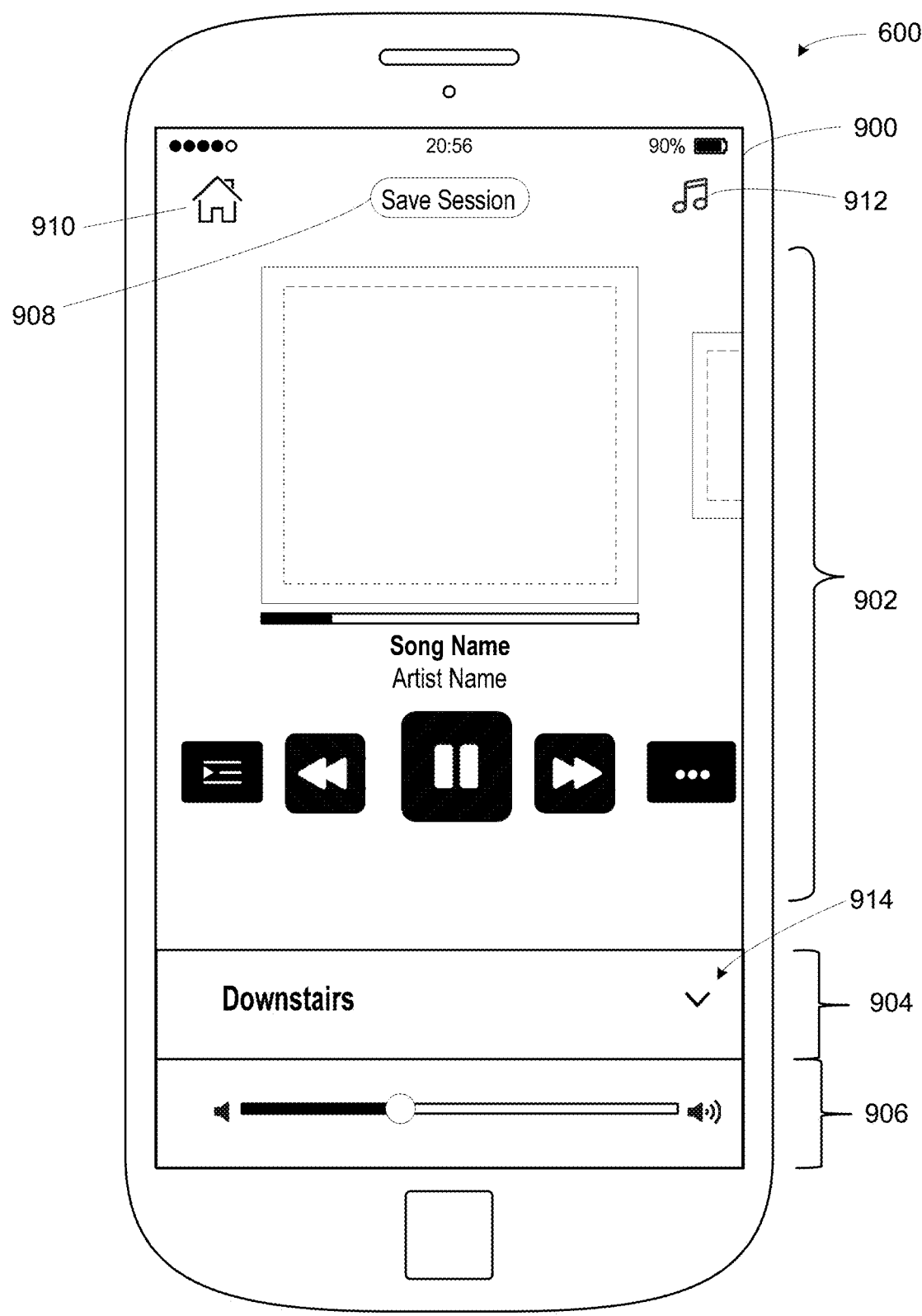
FIGS. 9A-E show a control device that is displaying another example control interface, according to an example implementation.
Figure 9B:
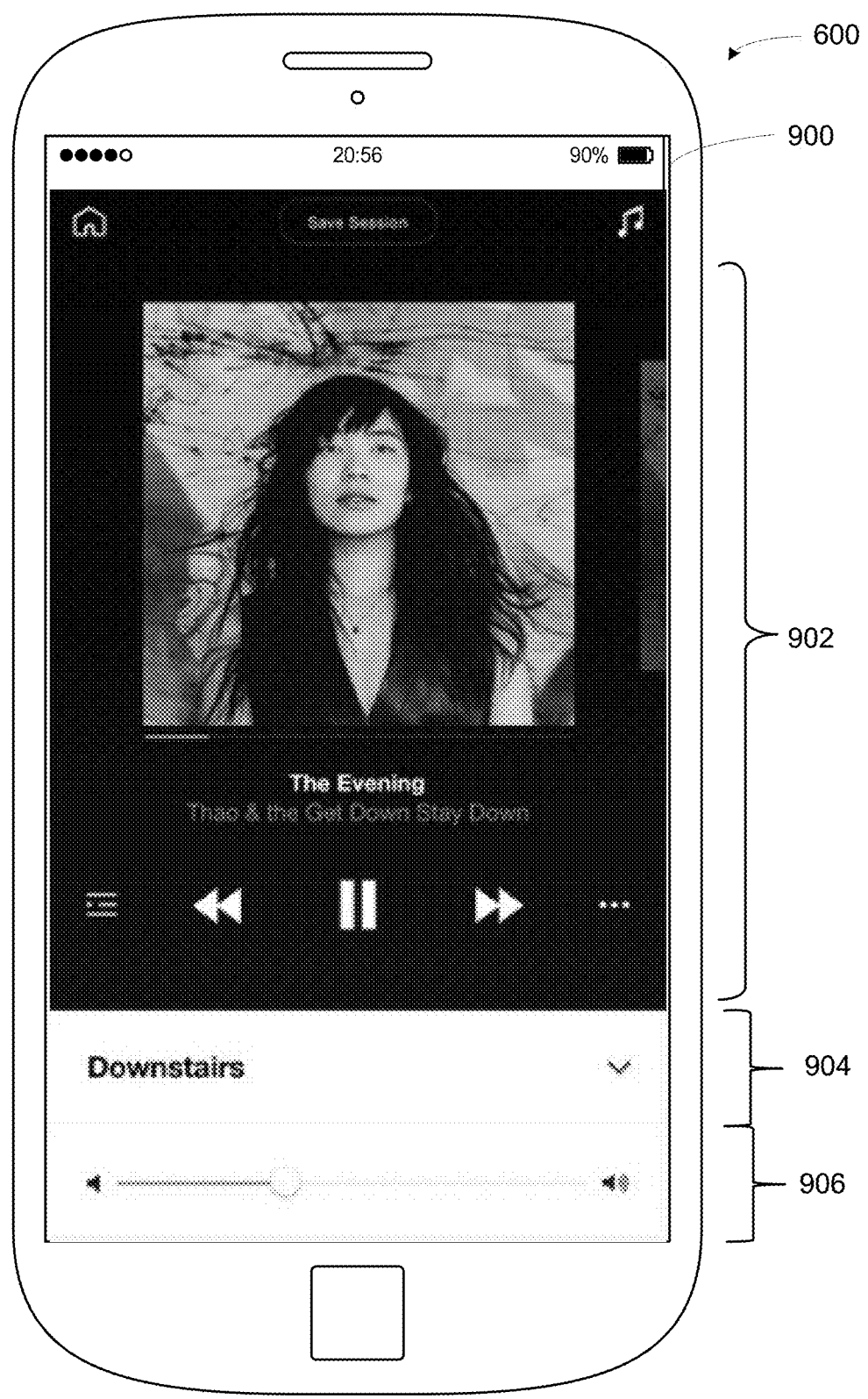
Figure 9C:
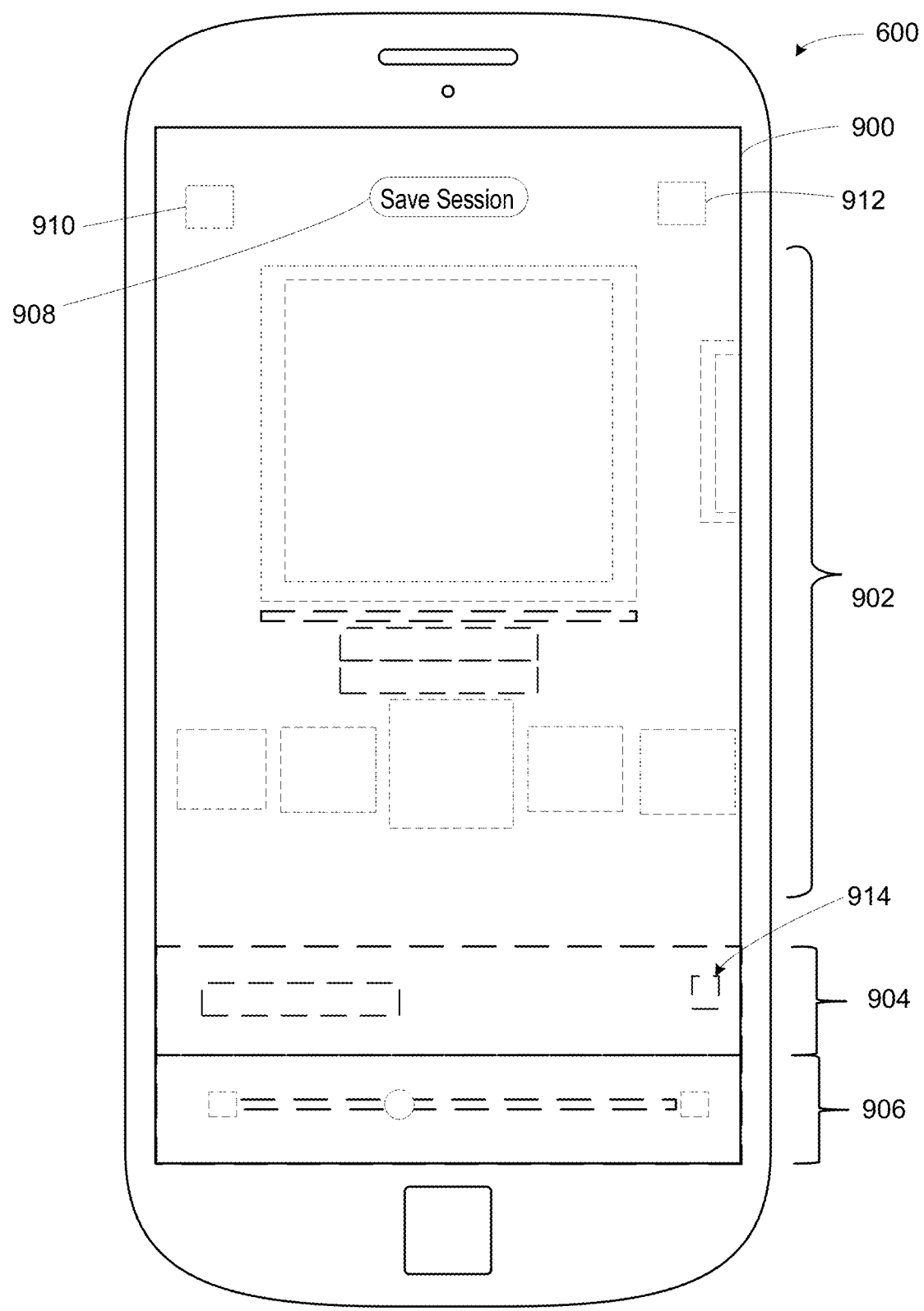
Figure 9D:
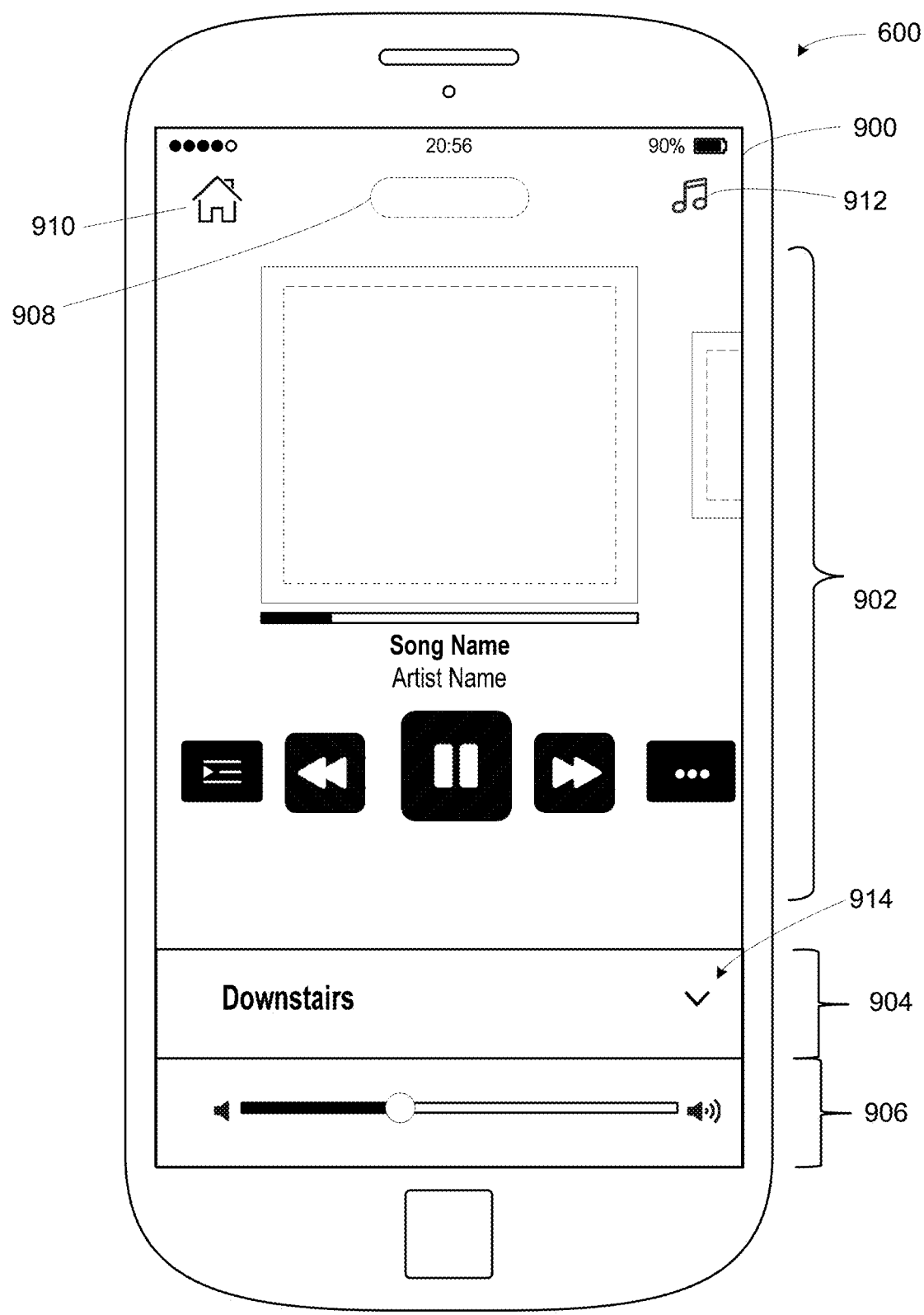
Figure 9E:
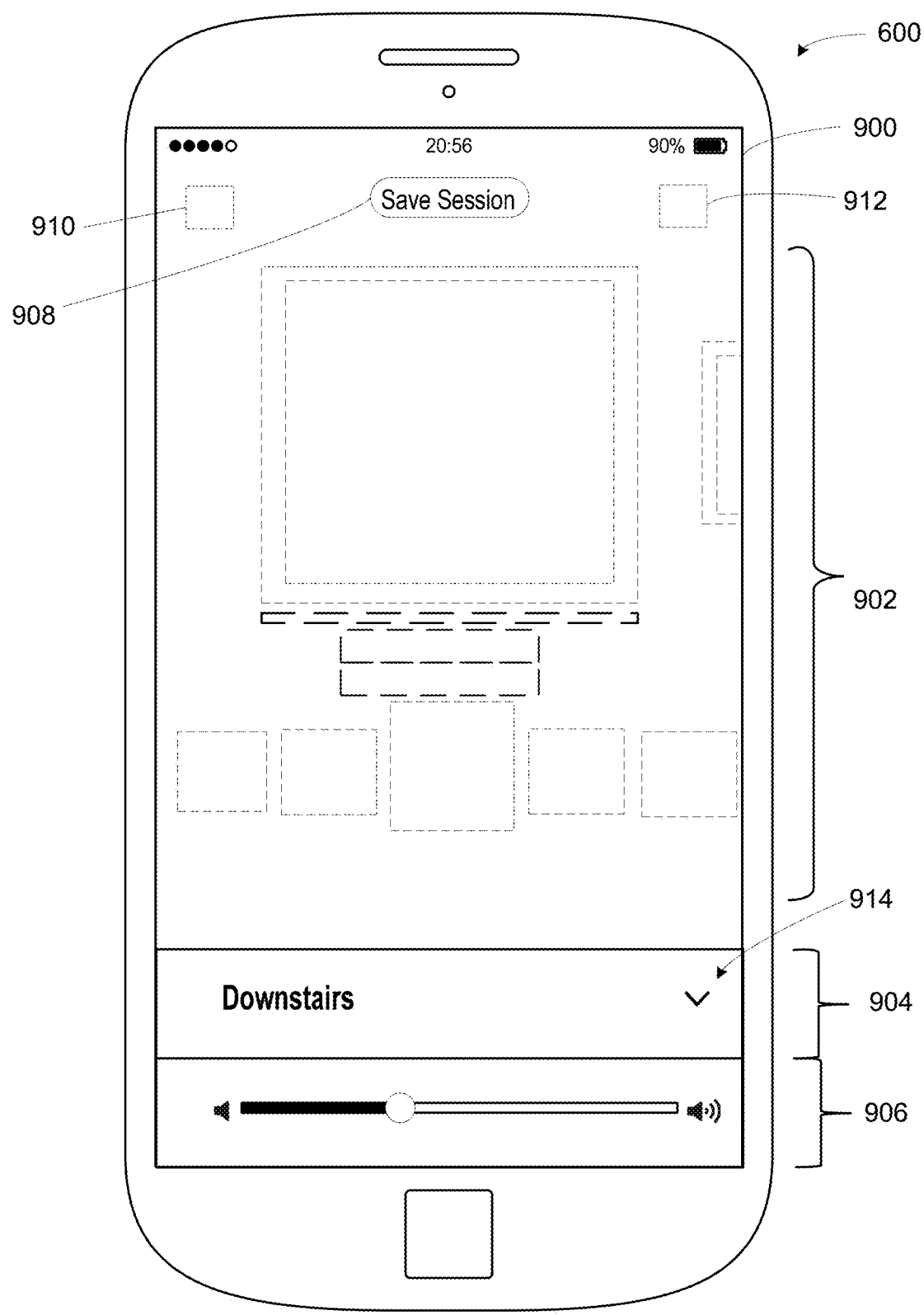

FIG. 9A, FIG. 9B, FIG. 10A, and FIG. 10B illustrate example control interfaces for a selected music session. In FIG. 9A, control device 600 displays an example control interface 900, which includes a playback control region 902, zone control region 904, and a volume control region 906. Control interface 900 also includes a save session icon 908, a home screen icon 910, and a music browsing icon 912. FIG. 9B illustrates an example embodiment of control interface 900 in FIG. 9A. FIGS. 9C, 9D, and 9E illustrate other example embodiments of control interface 900 in FIG. 9A. Control interface 900 may be referred to as a "now playing" interface as this interface includes graphical elements and/or regions indicating the currently playing media of an active session as well as controls for modifying the active session.

Playback control region 902 may include graphical elements corresponding to the audio track that is currently being played within the selected music session. For instance, as shown, playback control region 902 includes the album cover, song title, and artist corresponding to the audio track currently being played within the selected music session. Playback control region 902 also includes playback controls to pause the current audio track, play the next or previous audio track, add the audio track to a playlist or playback queue, and view a playlist or playback queue. Example embodiments may include different sets of transport controls.

An example zone control region 904 may include an indication of the zone or zone scene selected to play back audio tracks within the music session. The selected zone or zone scene of the active session may correspond to one or more physical playback devices (e.g., one or more respective playback devices per listening zone). As shown, zone control region 904 includes an indication that the current track within the music session (as shown in playback control region 902) is being played either (i) by a single playback device downstairs or (ii) in synchrony via two or more playback devices downstairs. Zone control region 904 includes a drop down icon 914 that may be selected to modify the listening zone(s) or zone scene of the active session. In some instances, selection of the zone scene name ("Downstairs") may allow a user to modify the name of the listening zone or zone scene.

Volume control region 906 includes a volume slider to control or modify volume of the selected zone or zone scene of the active session. In operation, changes to the volume level of the volume slider cause the control device to instruct the playback device(s) of the selected listening zone or zone scenes to adjust its/their respective volume levels. In one example, smartphone 600 transmits instructions via its network interfaces to the playback devices of the selected zone or zone scene, and each playback device of the selected zone or zone scene adjusts its volume in response to receiving the instructions. In another example, smartphone 600 directly controls the volume levels of each playback device of the selected zone or zone scene.

In some instances, when an area is selected (e.g., downstairs), playback settings of the playback devices in respective rooms of the area may be modified based on heuristics, common usage statistics, and/or contextual information associated with respective playback devices in an area or respective playback devices in a given room within the area.

For example, the media playback system may learn user preferences, such as volume level, for respective playback devices based on heuristics and common usage statistics. Within examples, the media playback system may learn that a particular user generally listens to music in the kitchen at a first volume level. Based on such data, the volume level of one or more playback devices that are physically located within the kitchen may be modified to the first volume level upon selection of a music session in the kitchen. In other examples, the media playback system may learn that a particular user generally listens to music in the kitchen at a first volume level and in the living room at a second volume level. Based on such data, the volume level of one or more playback devices that are physically located within the kitchen and living room may be modified to an average of the first and second volume level. Alternatively, the volume levels may be modified to a third volume level based on heuristics or common usage statistics for music sessions that include the kitchen and living room as an area (e.g., downstairs).

In further examples, an upstairs level of a home may include a master bedroom, bathroom, and a second bedroom. Respective playback devices may be physically located within the master bedroom and bathroom, while the second bedroom might not include a playback device. When the upstairs area is selected, the volume of the one or more playback devices in the master bedroom and the bathroom may be modified to compensate for the second bedroom that does not include a playback device. Such volume increase may facilitate the sessions being audible across the entire upstairs level, including in the second bedroom. In some instances, the volume of the one or more playback devices in the master bedroom and the bathroom is modified to a volume level corresponding to a typical volume level of when the upstairs area is selected for a music session.

In addition to heuristics and common usage statistics, it might be beneficial to modify playback settings of respective playback devices in some situations based on contextual information associated with the respective playback devices in an area or respective playback devices in a given room within the area. For example, a particular user listening to music at a first volume level via one or more playback devices that are physically located within the living room may wish to join one or more playback devices that are physically located within the kitchen to the music session. Upon selection to join the kitchen to the music session associated with the living room, the control device may cause one or more playback devices in the kitchen to adjust its volume to an equivalent volume level of the music session (e.g., the first volume level). Additionally, the control device may cause one or more playback devices in the kitchen to presume other playback settings (e.g., mute settings) of the one or more playback devices in the living room. Other examples of modifying playback settings based on heuristics, common usage statistics, and/or contextual information are possible.

Selection of the save session icon 908 may cause the control device (or any other device or server within the media playback system) to store the current music session. Saved music sessions may be displayed in a region listing saved music sessions. A saved music session may be selected from such a list to re-instantiate the session.

Selection of home screen icon 910 may cause display of a home screen interface. Control interface 700 of FIGS. 7A and 7B is an example of a home screen interface. Other examples are possible as well.

Selection of music browsing icon 912 may cause display of a music browsing interface. Control interface 800 of FIG. 8 is an example of a music browsing interface. Other examples are contemplated as well.

c. Display Interface(s) for Zone Selection

Referring back to FIG. 5, at block 506, implementation 500 involves displaying one or more interfaces for zone selection. For instance, a control device, such as control device 126 of media playback system 100, may cause a graphical display to display an interface (e.g., control interface 400 of FIG. 4), that includes one or more interfaces for selecting zones or zone scenes for a given session.

As noted above, zone control region 904 in FIG. 9A includes drop down icon 914 that may be selected to modify selection of the listening zones or zone scene. For instance, upon selection of drop down icon 914, the control device may cause the graphical display to display control interface 1000 in FIG. 10A and FIG. 10B to modify selection of the listening zones or zone scene. FIGS. 10C, 10D, 10E, and 10F illustrate other example embodiments of control interface 1000 in FIG. 10A.

Figure 10A:
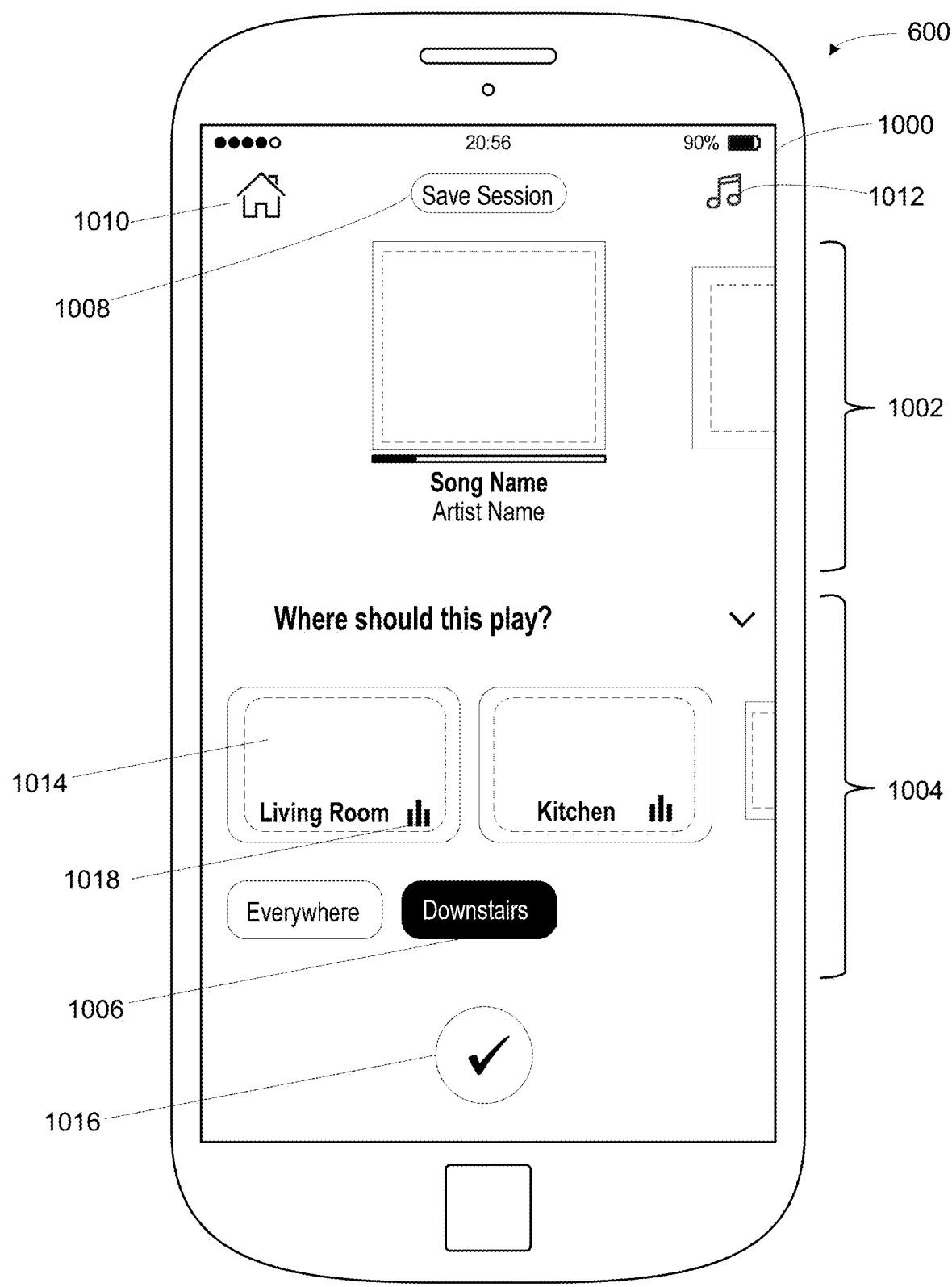
FIGS. 10A-F show a control device that is displaying yet another example control interface, according to an example implementation.
Figure 10B:
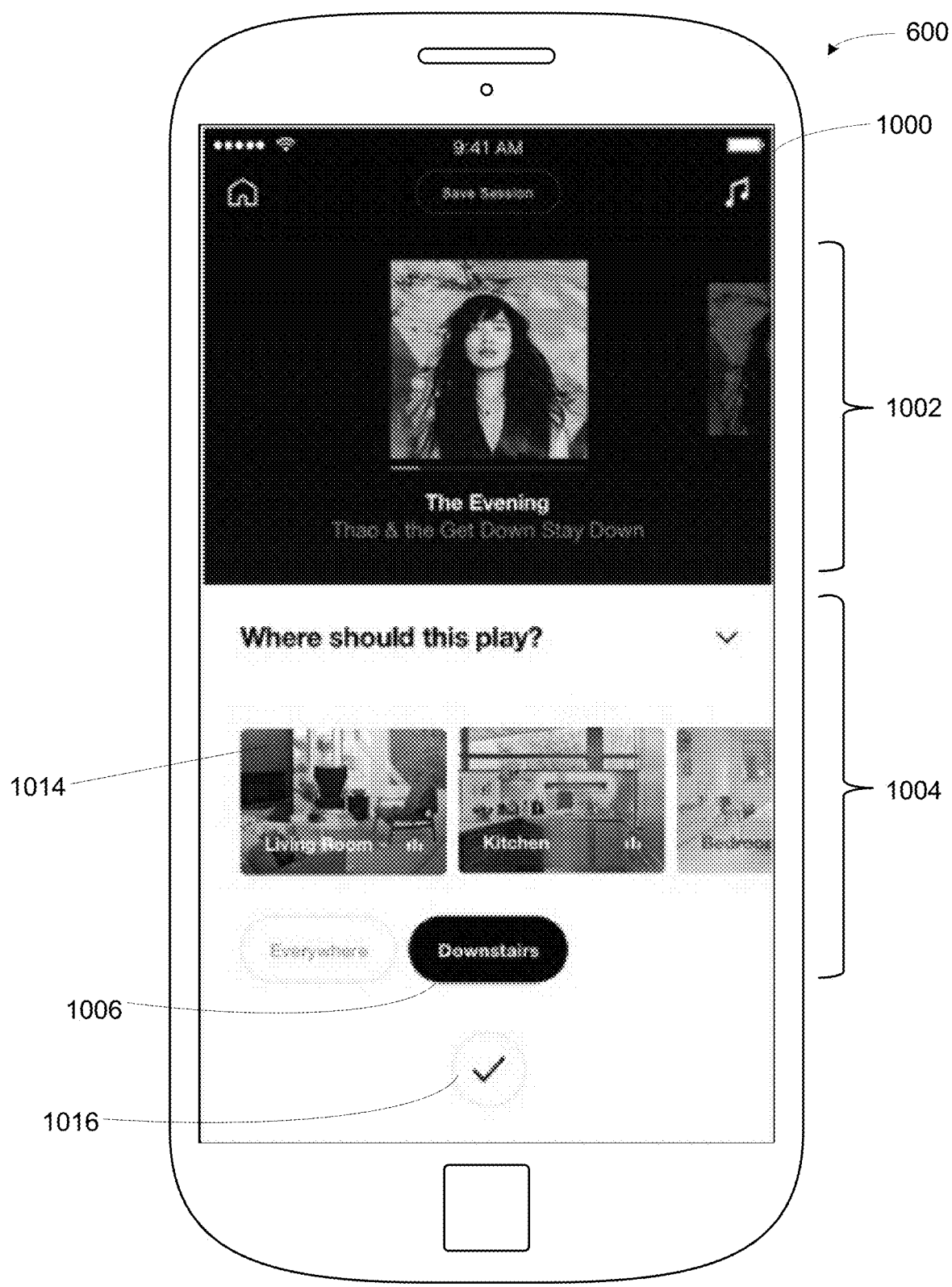
Figure 10C:
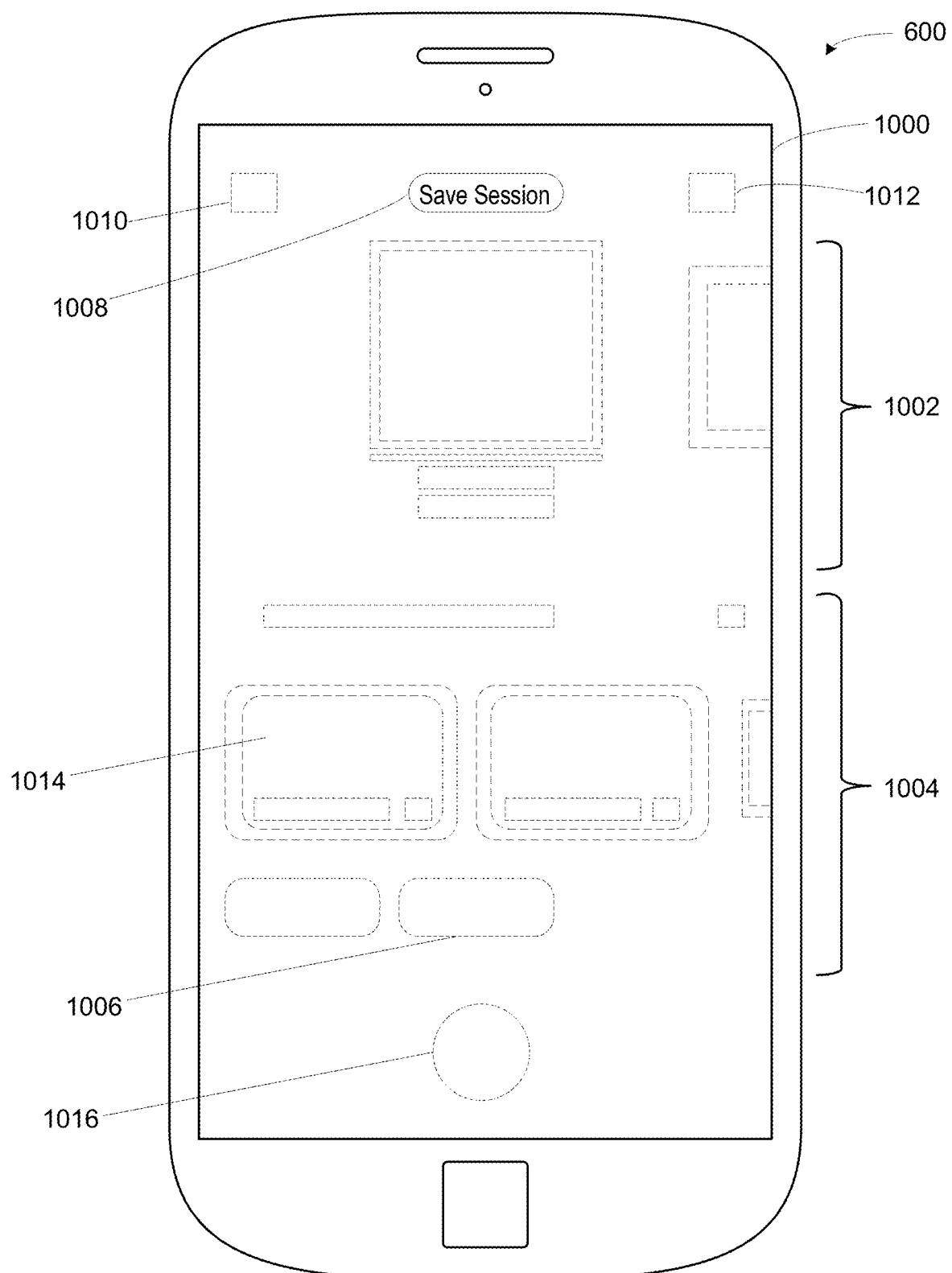
Figure 10D:
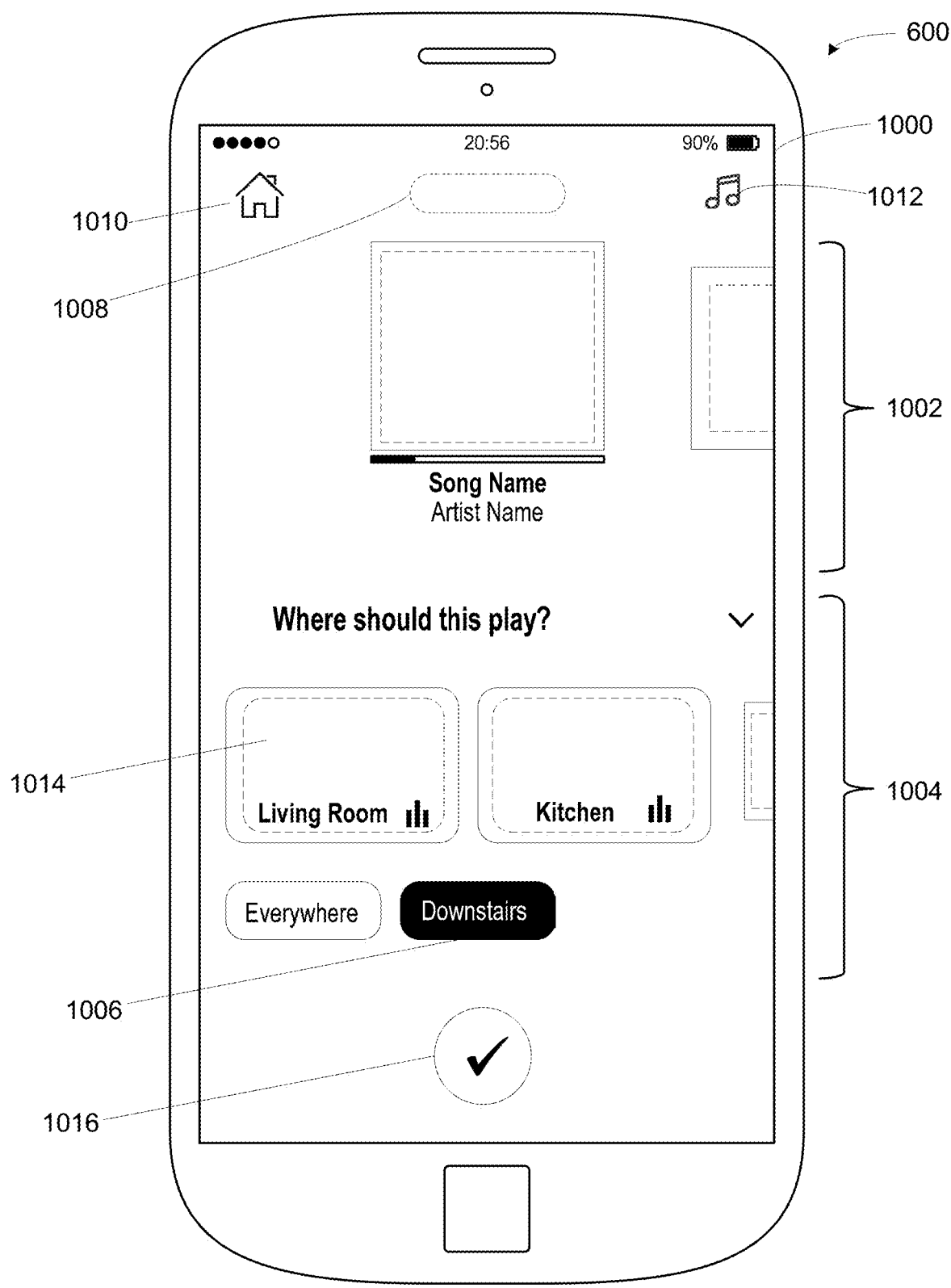
Figure 10E:
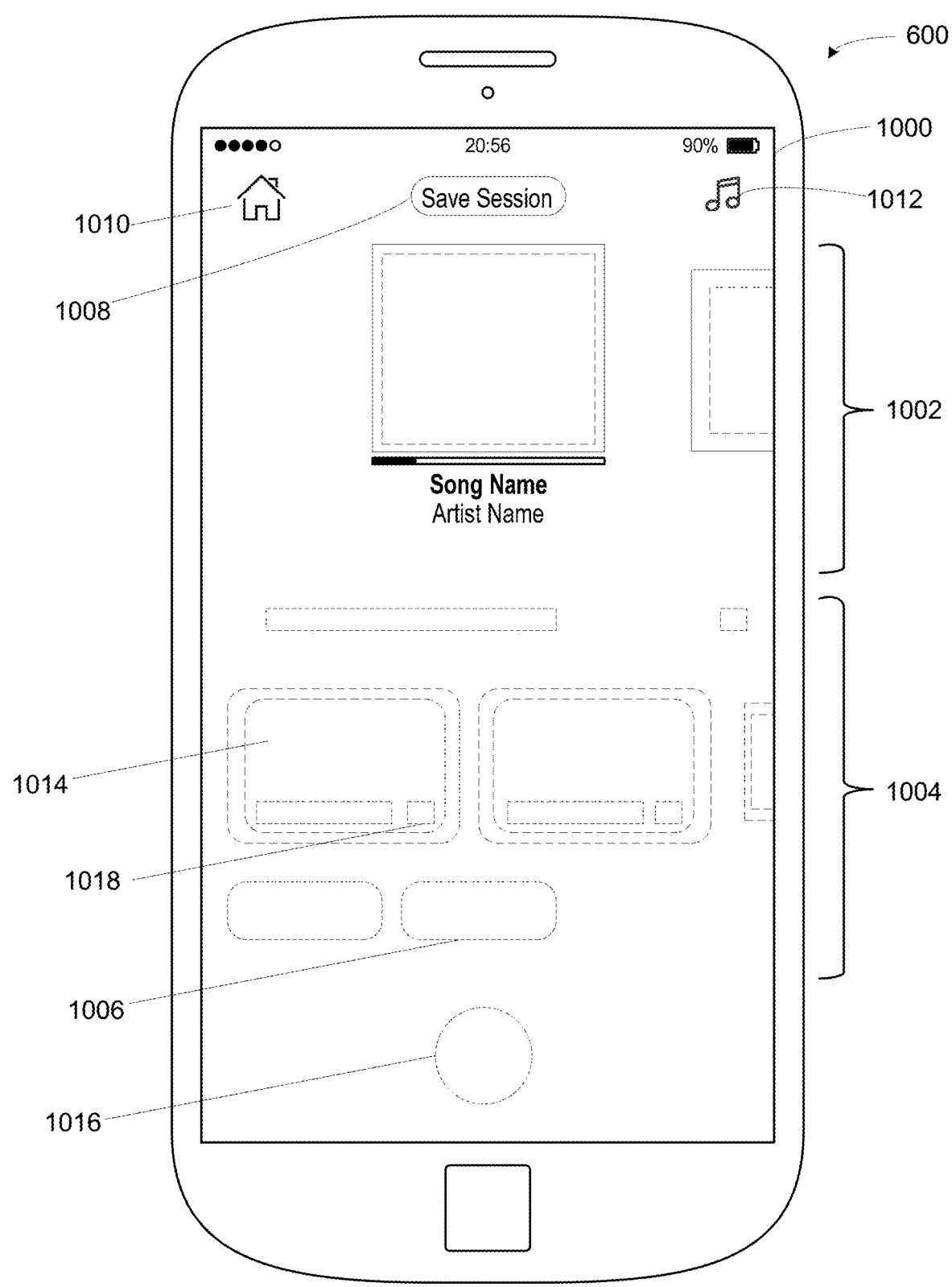
Figure 10F:
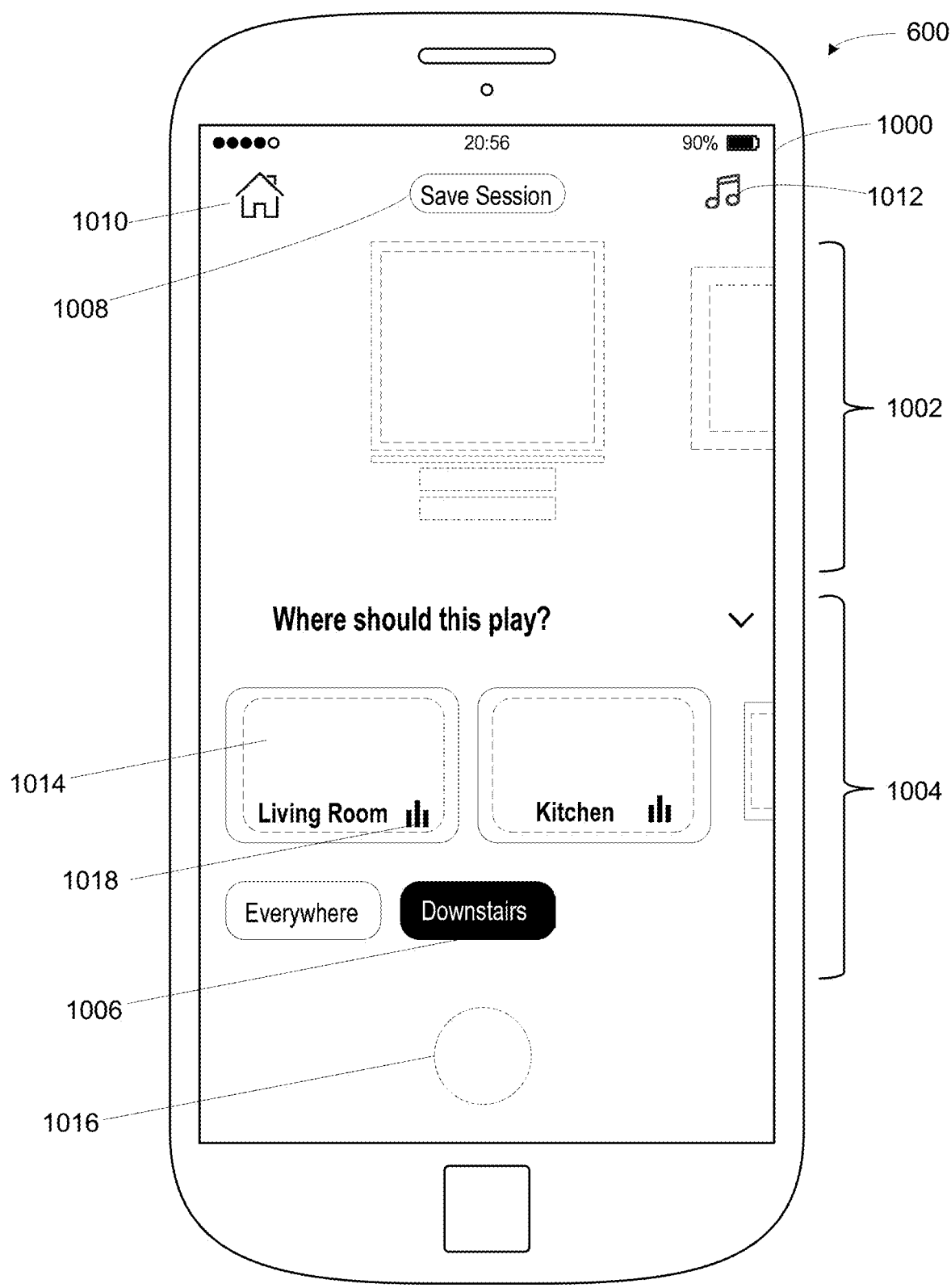

In FIG. 10A, control device 600 displays an example control interface 1000, which includes a playback region 1002, room control region 1004, save session icon 1008, home screen icon 1010, music browsing icon 1012, room indicator 1014, and confirmation icon 1016. FIG. 10B illustrates an example screen capture of control interface 1000 in FIG. 9B. Control interface 1000 may be referred to as a "room controller" interface.

Playback region 1002 includes graphical elements corresponding to the audio track that is currently being played within the selected music session. For instance, as shown, playback region 1002 includes an album cover, song title, and artist corresponding to an audio track currently being played within the selected music session. Additionally playback region 1002 may also include playback controls (not shown) to pause the current audio track, play the next or previous audio track, add the audio track to a playlist or playback queue, and view a playlist or playback queue, among other possibilities Room control region 1004 includes a prompt to select one or more zones or zone scenes to play back audio tracks within the music session in synchrony via one or more playback devices with the selected zone or zone scene. Additionally, room control region 1004 includes a list of zones, such as living room indicator 1014, and a list of zone scenes (e.g., "Everywhere," "Downstairs") to select for synchronous play back, where all of the playback devices within the selected zone or zone scene play back the audio track(s) within the music session in synchrony with each other. The list of zones in room control region 1004 may be displayed in various orders, such as alphabetical order or physical proximity of the zone to the control device, among other examples. In some instances, the list of zones in room control region 1004 may be rearranged by, for example, dragging a particular zone indicator (e.g. living room indicator 1014) in front of or behind another zone indicator.

In some embodiments, selection of one of the listed zone scenes in room control region 1004 causes two or more playback devices of listening zones within the zone scene to play back audio in synchrony. For instance, in one example, selecting the zone scene for the first floor of a household causes two or more playback devices in the first floor (e.g., kitchen, living room, bathroom, bedroom) to play audio in synchrony with each other.

Similarly, in some embodiments, selection of one or more of the listed zones in room control region 1004 causes one or more playback devices within the selected one or more zones to play back audio in synchrony. In operation, the room control region displays an indication of the selected zones. In some instances, a zone may by grayed out or highlighted within room control region 1004 to indicate that the zone has been selected. As shown, the Living Room indicator 1014 and Kitchen indicator are highlighted to indicate that the zones have been selected. Additionally, Living Room indicator 1014 includes a bar indication 1018 to indicate that the zone has been selected for the music session.

In other instances, room control region 1004 only displays zones that are available for selection and have not already been selected. In operation, upon selection of a zone listed in the room control region 1004, the control device causes control interface 1000 to remove the selected zone from the list of zones listed in the room control region 1004 to indicate that the zone has been selected or is no longer available for selection. For example, selection of Living Room indicator 1014 in room control region 1004 removes the Living Room indicator 1014 in room control region 1004.

Selection of the save session icon 1008 causes the control device (or perhaps one or more other devices or servers within the media playback system) to store the current music session. As noted above, saved music sessions may be displayed in a region listing saved music sessions. A saved music session may be selected from such a list to re-instantiate the session.

Various graphical elements of control interface 1000 may be used to navigate between control interfaces. For instance, selection of the home screen icon 1010 causes display of a home screen interface, such as control interface 700. Similarly, selection of the music browsing icon 1012 causes display of a music browsing interface, such as control interface 800. Other examples are possible as well.

In some embodiments, upon selection of confirmation icon 1016, the control device causes the graphical display to display the now playing interface, such as control interface 900. Alternatively, upon selection of confirmation icon 1016, the control device may cause the graphical display to display the home screen interface (e.g., control interface 700) or the music browsing interface (e.g., control interface 800). In some instances, changes to modify the selection of zones or zone scenes via the room control region 1004 might not be applied until selection of confirmation icon 1016.

In some instances, upon selection of one or more zones or zone scenes in control region 1004, the volume of the one or more playback devices of the selected zones may be normalized. In some examples, the volume of the one or more playback devices of the selected zones may be normalized based on historical listening settings for the particular music session and/or respective one or more playback devices of the selected zones. Within examples, if the living room and kitchen of a household are selected, the volume of one or more playback devices within the living room and kitchen may be normalized based on past listening volumes of the one or more playback devices within the living room and kitchen, respectively.

In other examples, the volume of the one or more playback devices of the selected zones may be normalized based on the most recent volume settings of a particular zone. Within examples, the living room may have been initially selected as the zone to play audio for a particular music session. Upon selection of the kitchen to play audio in synchrony with the living room, the one or more playback devices in the kitchen may be normalized to the volume level of the one or more playback devices in the living room.

IV. Example Techniques to Navigate from Interface to Interface

Figure 11:
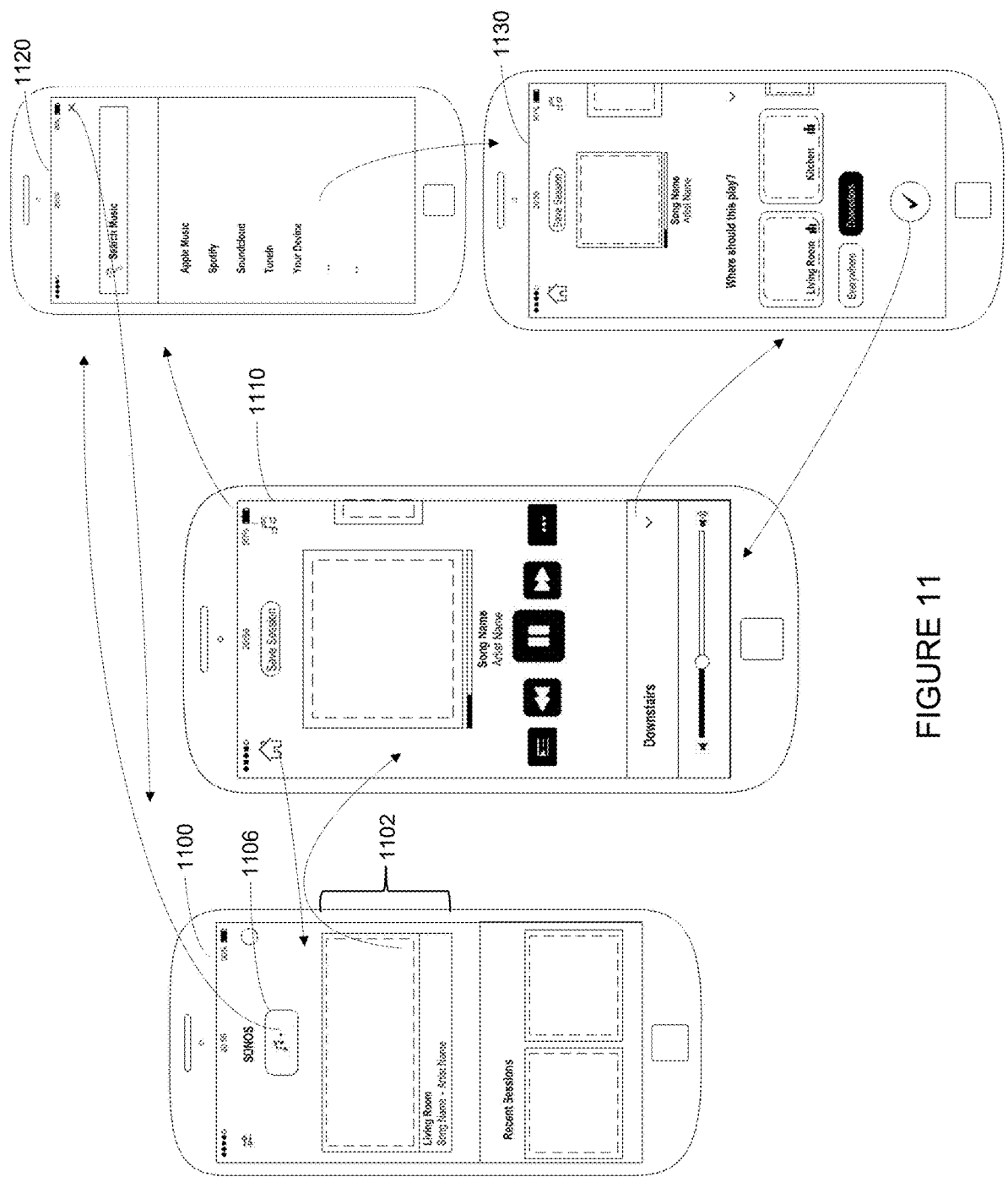
FIG. 11 shows example techniques to navigate from one interface to another, according to an example implementation.
Figure 12D:
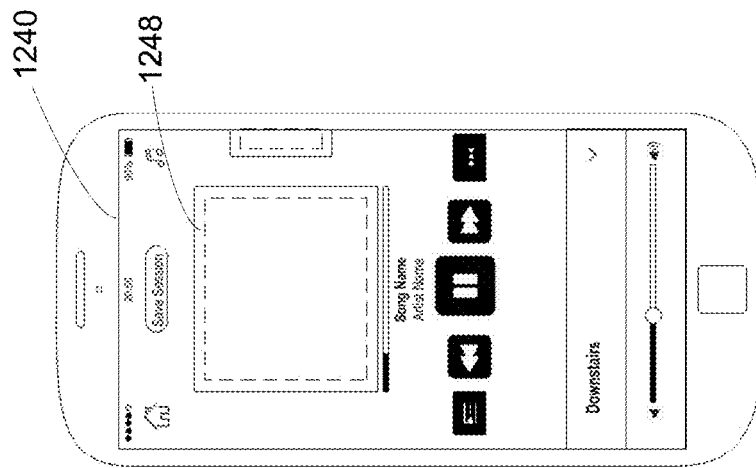
Figure 12C:
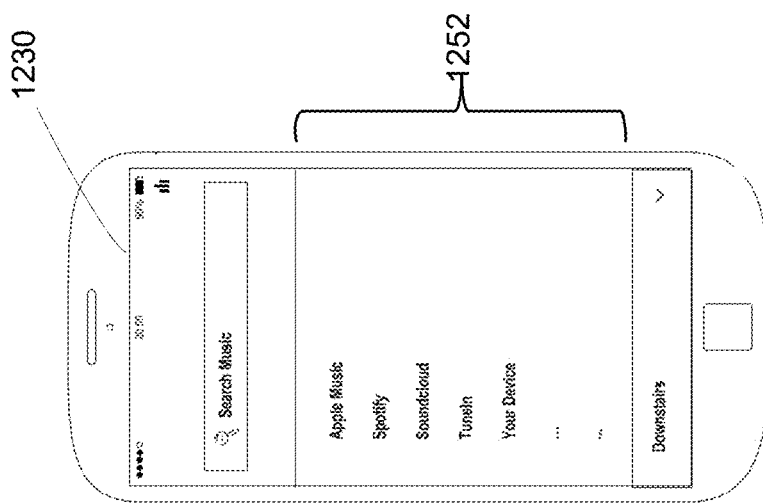
Figure 13D:
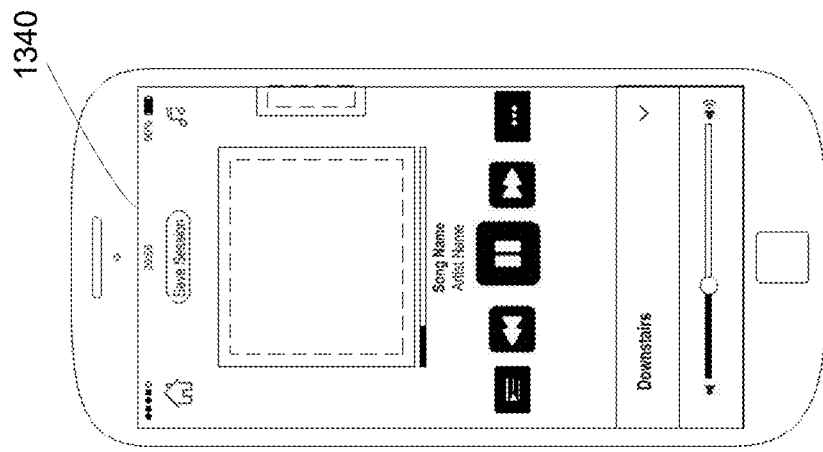
Figure 13C:
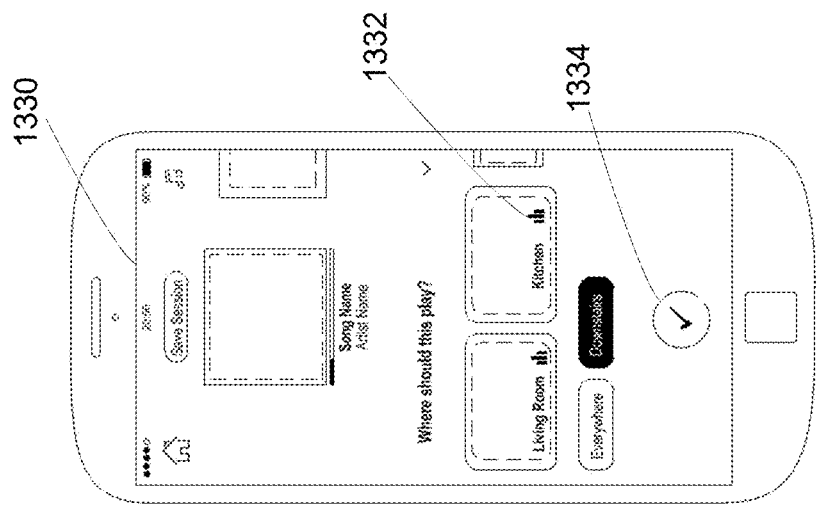

FIG. 11 illustrates example techniques to navigate from or to control interface 1100, control interface 1110, control interface 1120, and control interface 1130. Control interface 1100 is an example of a home screen interface (e.g., control interface 700), control interface 1110 is an example of a now playing interface (e.g., control interface 900), control interface 1120 is an example of a music browsing interface (e.g., control interface 800), and control interface 1130 is an example of a room controller interface (e.g., control interface 1000).

As shown, from control interface 1100, selection of the music selection indicator 1106 (corresponding to new session indicator 706 of FIGS. 7A and 7B) may cause display of control interface 1120 (i.e., a music browsing interface). In some instances, from control interface 1100, selection of the first display region 1102 (corresponding to first display region 702) may cause display of control interface 1110 (e.g., a now playing interface).

From control interface 1110, selection of the home screen icon (corresponding to home screen icon 910 of FIGS. 9A and 9B) may cause display of control interface 1100 (e.g., a home screen interface). In some instances, from control interface 1110, selection of the music browsing icon (corresponding to music browsing icon 912 of FIGS. 9A and 9B) may cause display of control interface 1120 (e.g., a music browsing interface). In other instances, from control interface 1100, selection of the drop down icon (corresponding to drop down icon 914 of FIGS. 9A and 9B) may cause display of control interface 1130 (e.g., a room controller interface).

From control interface 1120, selection of a particular audio track from a search (via the search tool or browsing tool) may cause display of control interface 1130 (e.g., a room controller interface). Alternatively, selection of the particular audio track from the search (via the search tool or browsing tool) may cause display of control interface 1110 (e.g., the now playing interface). In some instances, from control interface 1120, selection of a close icon ("x"), may cause display of control interface 1100 (e.g., a home screen interface). Alternatively, selection of the close icon ("x"), may cause display of control interface 1110 (e.g., a now playing interface).

From control interface 1130, selection of the confirmation icon (corresponding to confirmation icon 1016) may cause display of control interface 1110 (e.g., a now playing interface).

In example operations, a control device may receive a command to select a particular music session from the home screen interface. In response, the control device may cause the graphical display to display the selected music session in the now playing interface. In some instances, the control device may receive a command to create a new music session while in the now playing interface. FIGS. 12A-D illustrate example operations to create a new music session from control interface 1200.

As shown, control interface 1200 includes playback control region 1202 (corresponding to playback control region 902 of FIGS. 9A and 9B), zone control region 1204 (corresponding zone control region 904 of FIGS. 9A and 9B), and volume control region 1206 (corresponding volume control region 906 of FIGS. 9A and 9B). Playback control region 1202 includes an album cover (e.g., "1") corresponding to an audio track for the selected music session. Selection of the play icon 1212 within playback control region 1212 may cause display of control interface 1210 in FIG. 12B. As shown, control interface 1210 of FIG. 12B replaces the play icon 1212 in FIG. 12A with pause icon 1214.

In order to create a new music session, the music browsing icon (corresponding to music browsing icon 912 of FIGS. 9A and 9B) may be selected. Upon selection of the music browsing icon (corresponding to music browsing icon 912), the control device may cause the graphical display to display control interface 1220 in FIG. 12C (e.g., a music browsing interface). Control interface 1220 may be used to search for particular audio content to create a new music session. Upon search and selection of a particular audio content, the control device may cause the graphical display to display control interface 1240 in FIG. 12D (e.g., a now playing interface). As shown, control interface 1240 includes the album cover (e.g., "2") corresponding to the selected audio content for the new music session.

In other example operations, a control device may receive a command to add another zone to a currently-playing zone to play back audio in synchrony via the playback devices within the currently-playing zone and the added zone. For instance, an individual listening to music in the living room may decide to prepare a meal in the kitchen. The individual may wish to add one or more playback devices in the kitchen to play back audio in synchrony with the one or more playback devices in the living room for the current music session. FIGS. 13A-D illustrate example operations to add zones to a session to play back audio in synchrony.

Control interface 1310 in FIG. 13A is a now playing interface, such as control interface 900. As shown, control interface 1310 displays a music session in the living room of a household. To add one or more zone players in the kitchen to the current music session, control interface 1310 includes drop down icon 1314 (corresponding to drop down icon 914). Upon selection of the drop down icon 1314, the control device causes the graphical display to display control interface 1320 in FIG. 13B. Control interface 1320 is a room controller interface, such as control interface 1000.

From control interface 1320, an individual may select the kitchen to play audio in synchrony with the living room for the current music session. Upon selection of the kitchen indicator 1322, the control device causes the graphical display to display control interface 1330 in FIG. 13C. Control interface 1330 is another instance of a room controller interface. As shown, control interface 1330 includes bar indicators (e.g., bar icon next to "Kitchen") to indicate the selected zones for synchronous playback. In some instances, if the household only has playback devices in the kitchen and living room within the main floor of the household, the zone scene indicator (e.g., "Downstairs") may be updated to indicate that all playback devices within the main floor have been selected.

The confirmation icon 1334 may be selected to confirm selection of the zones and play back audio in the kitchen and the living room in synchrony. Upon selection of the confirmation icon 1334, the control device causes the graphical display to display control interface 1340 in FIG. 13D. As shown, the zone control region is updated from "Living Room" in FIG. 13A to "Downstairs" to indicate that all the playback devices within the kitchen and living room (e.g., or all playback devices downstairs) area have been selected.

The following appended graphics and description provide additional details and aspects to further illustrate example embodiments and features described herein.

V. Assigning Attributes to Playback Devices and Playback Zones

The controller applications executed by controller devices (e.g., 126, 300) for controlling playback devices (e.g., 102-124, 200) via the graphical user interfaces (e.g., 400, 700, 800, 900, 1000, 1100, 1120, 1130, 1200, 1210, 1240, 1310, 1320, 1330, 1340) disclosed and described herein with reference to FIGS. 1-13 provide users with a feature-rich and intuitive way to configure and control playback devices, including but not limited to grouping multiple playback devices into synchrony groups and zones, configuring and recalling zone scenes, and navigating music selections and playback sessions.

In some instances, it is desirable to automatically assign attributes to playback devices and/or groups of playback devices, e.g., synchrony groups, zone groups, zones, stereo paired players, bonded players, and other groupings of playback devices including but not limited to the playback device groupings described herein.

In some embodiments, automatically assigning attributes to playback devices and/or groups of playback devices enables multiple controller applications (running on the same or different controller devices and/or on cloud computing systems) to control at least some functions of a media playback system individually or in combination with other devices. For example, it may be desirable for a "smart home" controller application to control the media playback system individually or in combination with other appliances and/or devices, e.g., lights, a television, and blinds in a home theater setting. In in one example embodiment, the "smart home" controller application receives a command to activate a "home theater" mode, and in response, (i) commands the window shades in a media room to close, (ii) commands certain lights in the media room to activate and/or deactivate, and perhaps set an illumination level and/or hue of the activated lights, (iii) commands a television or projector in the media room to awake from an idle mode and/or switch to a particular video or other media input or inputs, and (iv) command the media playback system in the media room to awake from an idle mode and/or configure one or more playback devices in the media playback system in the media room for playing audio in a surround sound configuration. Although a "smart home" controller application is used as an example here, the systems and method disclosed and described herein are equally applicable to other controller applications and types of controller applications as well.

One challenge of controlling (or enabling control of) a media playback system with a multiple controller applications as described in the example above is dealing with inconsistent and perhaps conflicting and/or incompatible naming conventions across the multiple controller applications. For example, a first controller application for the media playback system may use different naming conventions for playback devices, rooms, groups of playback devices, and so on, as compared to the second controller application. In some instances, a user may get confused when the same device or devices have different names or other different identifiers in different controller applications. For example, a playback device (or group of playback devices) may be designated as located in the "Living Room" (see, e.g., FIG. 7A) in a first controller application, but this same device (or devices) may be designed as located in a "Theater" in a second controller application, perhaps because one of the first or second controller application does not support the "Living Room" or the "Theater" designator. The problem of inconsistent naming is more acute in scenarios where a playback device (or group of playback devices) is designated as "John's Office" in a first controller application, but the second controller application does not support customized room naming, for example.

In addition to causing confusion for a user who may access different controller applications to control the same devices, the problem of inconsistent naming of devices and rooms is compounded when using a voice control application because a voice command to, for example, play a particular song in the "Living Room" (as designated by a first controller application) may not be executed properly by a voice control application (a second controller application) when the voice control application does not have a record of a room called a "Living Room" and instead, has the playback device(s) of the "Living Room" associated with a room designated as "Theater." Another problem arises when a first controller application identifies a first room as the "Living Room" and a second room as the "Den" while a second controller application identifies the first room as the "Theater" and the second room as the "Living Room" because commands to perform functions in the "Living Room" can cause conflicts and/or inconsistent results because two different rooms (i.e., the first room and the second room) are both identified as the "Living Room" in two different controller applications (i.e., the first controller application and the second controller application).

In some instances, this problem could be solved by the user creating a naming convention that is supported by all the different controller applications. But in practice, users often purchase and install different systems over time, so what may have been fine for a system initially causes an incompatibility when a new system and/or controller application is introduced later. Going back and renaming devices manually can be time consuming and cumbersome, particularly if a user must rename devices and/or rooms multiple times as new devices and controller applications are added to a system of "smart home" devices.

One way to solve the problem of inconsistent and/or incompatible naming between one or more different controller applications and/or controller devices configured to control the same playback device (or devices), is via a method of reconciling naming discrepancies across different controller applications and/or controller platforms.

In some embodiments, a playback device of the media playback system has a corresponding first set of device attributes used by a first controller application to control the playback device. In some embodiments, the first controller application uses attributes of the first set of attributes to identify and/or control individual playback devices, groupings of playback devices, rooms, zones, and other arrangements and/or locations of playback devices. For example, in some embodiments, the first controller application uses a "player name" or "zone name" or "zone group name" or other attribute to display a player name for a particular playback device within a graphical user interface, e.g., shown as "Living Room" in region 702 of FIG. 7D, "Downstairs" in region 914 of FIG. 9A, and "Living Room" and "Kitchen" in region 1004 of FIG. 10A. In some embodiments, the first controller application additionally uses the attribute names to control individual playback devices by, for example, receiving commands via the graphical user interface to group/un-group playback devices into/out of synchrony groups, playback media content, control volume, etc. In some embodiments, the first application additionally or alternatively uses attributes from the first set of attributes to send commands to individual playback devices. Further, in some embodiments, after adding a selected attribute from the second set of attributes to the first set of attributes, the first application uses the selected second attribute that was added to the first set of attributes to send commands to an individual playback device.

In operation, one or more device attributes in a second set of device attributes used by a second controller application to control the playback device (or any other device or type of device) are reconciled with one or more device attributes in the first set of device attributes used by the first controller application so that common naming for the same devices can be used across the first controller application and the second controller application (and perhaps additional controller applications, too).

In some embodiments, a single controller application may use one or more attributes from a first set of playback device attributes and one or more attributes from a second set of playback device attributes to control an individual playback device or a group of playback devices. In such embodiments, the controller application selects a second attribute based at least in part on a first attribute. For example, in one embodiment, the controller application selects a room name (and/or perhaps a zone name, area name, or other location designation) attribute associated with a playback device based on a player name attribute associated with the playback device in a manner similar to or the same as described herein with respect to embodiments where the first and second sets attributes are used by corresponding first and second controller applications, respectively. In another example, the controller application selects a room type attribute for a playback device based on a room name attribute associated with the playback device in a manner similar to or the same as described herein with respect to embodiments where the first and second sets attributes are used by corresponding first and second controller applications, respectively.

In some embodiments involving multiple controller applications, the first controller application is a native controller application provided by a manufacturer of the playback device. For example if the playback device is manufactured by Acme Corp., the first controller application is a controller application provided by Acme Corp. and configured to run on a computing device (e.g., as smart phone, tablet, desktop computer, smart watch, cloud computing system, or other computing system or device) for controlling the first playback device. And in some embodiments, the second controller application is a non-native controller application that is not provided by the manufacturer of the playback device. In some embodiments, the second controller application is a "smart home" or similar controller application.

Alternatively, in some embodiments, the second controller application is a native application provided by the manufacturer of the playback device, and the first application is a non-native controller application that is not provided by the manufacturer of the playback device (e.g., a smart home controller application or other type of controller application). Alternatively, both the first controller application and the second controller application are non-native applications, i.e., where the playback device is manufactured by Acme Corp., but neither the first controller application nor the second controller application are provided by Acme Corp.

In some embodiments, the first set of attributes used by the first controller application to control the playback device may include, but is not limited to, one or more of (i) a name of the playback device (e.g., "John's Boom Box", "Kitchen Speaker", "Theater Amp", and so on), (ii) a type of playback device (e.g., a sound bar, a subwoofer, a surround sound satellite speaker, a floor speaker, a bookshelf speaker, and so on), (iii) an icon or image (1014) representing the playback device in the first controller application, (iv) a configuration of the playback device (e.g., whether the playback device is a standalone player, a left or right channel player, whether the playback device is grouped with one or more additional playback devices and configured to play media in synchrony with each other, and so on), (v) the name of the room in which the playback device is located (e.g., Theater, Living Room, Basement, Bedroom, Office, John's Office, Jane's Bedroom, and so on), (vi) the type of room in which the playback device is located (e.g., a kitchen, a bedroom, a bathroom, a living room/den, and so on), (vii) a zone (904) that the playback device is associated with (e.g., downstairs, basement, first floor, second floor, bedroom, and so on), (viii) an area where the playback device is located or other associated with (e.g., "kitchen," atio," "kitchen+patio," and so on); and/or (ix) a playback session (708) the playback device is associated with.

In some embodiments, the second set of attributes includes one or more attributes that are similar to or the same as one or more attributes of the first set of attributes. For example, the second set of attributes may include, but is not limited to, one or more of (i) a name of the playback device (e.g., "John's Boom Box", "Kitchen Speaker", "Theater Amp", and so on), (ii) a type of playback device (e.g., a sound bar, a subwoofer, a surround sound satellite speaker, a floor speaker, a bookshelf speaker, and so on), (iii) an icon or image (1014) representing the playback device in the first controller application, (iv) a configuration of the playback device (e.g., whether the playback device is a standalone player, a left or right channel player, whether the playback device is grouped with one or more additional playback devices and configured to play media in synchrony with each other, and so on), (v) the name of the room in which the playback device is located (e.g., Theater, Living Room, Basement, Bedroom, Office, John's Office, Jane's Bedroom, and so on), (vi) the type of room in which the playback device is located (e.g., a kitchen, a bedroom, a bathroom, a living room/den, and so on), (vii) a zone (904) that the playback device is associated with (e.g., downstairs, basement, first floor, second floor, bedroom, and so on), (viii) an area where the playback device is located or other associated with (e.g., "kitchen," patio," "kitchen+patio," and so on); and/or (ix) a playback session (708) the playback device is associated with.

In some embodiments, the attributes of the first set of attributes are different than the attributes of the second set of attributes. In some embodiments, at least some attributes of the first set of attributes are the same as or similar to at least some attributes of the second set of attributes, and at least some attributes of the first set of attributes are different than at least some attributes of the second set of attributes.

In operation, the computing device, individually or in combination with one or more computing devices, identifies the second set of device attributes for controlling the playback device. In some embodiments, the second set of attributes is used by a second controller application to control the playback device. The computing device may be a control device (e.g., control device 300), a playback device (e.g., playback device 200), a cloud computing system (not shown), or any other computing device now known or later developed.

In some embodiments, the computing device identifies the second set of device attributes used by the second controller application by receiving the second set of device attributes from the second controller application. In some embodiments, the computing device identifies the second set of device attributes used by the second controller application by accessing a cloud computing system and/or downloading and/or other receiving the second set of device attributes from a cloud computing system. In still further embodiments, the computing device identifies the second set of device attributes used by the second controller application by accessing an application programming interface (API) or other computing program (or portion thereof) configured to allow one or both of the first or second controller applications to control the playback devices and/or the media playback system comprising the playback devices. In still further embodiments, the computing device identifies the second set of device attributes used by the second controller application by accessing a database of attributes stored in memory accessible by the first controller application.

In some embodiments, the first controller application and the second controller application may be executed on the same computing device. In other embodiments, the first controller application and the second controller application may be executed on different computing devices and/or by different computing systems.

In operation, after identifying the second set of device attributes used by the second controller application to control the playback device, the computing device (individually or in combination with one or more other computing devices) selects a second device attribute for the playback device from the second set of device attributes used by the second controller application based at least in part on a first device attribute of the first set of device attributes used by the first controller application.

In operation, in some embodiments, a "room type" (or other attribute) is selected from the second set of attributes used by the second controller application based on one or more device attributes in the first set of attributes. For example, the computing device may select a "room type" attribute from the second set of attributes based on one or more attributes from the first set of attributes (e.g., the player name, the player type, the player icon, and so on).

For example, if the first set of attributes includes a player name with "bedroom" in it (e.g., the player name is "John's Bedroom"), then a "room type" of "bedroom" is selected from the second set of attributes. Similarly, if the first set of attributes includes a player name with "'s Room" (e.g., the player name is "Jane's Room"), then a "room type" of "bedroom" is selected from the second set of attributes. In another example, if the first set of attributes includes a player icon associated with a bedroom, then a "room type" of "bedroom" is selected from the second set of attributes. In another example, if the first set of attributes includes a player type attribute of "play bar" or "sound bar", then a "room type" of "media room" is selected from the second set of attributes. In yet another example, if the first set of attributes includes a player configuration attribute of "5.1 Surround Sound" or similar, then a "room type" of "media room" is selected from the second set of attributes.

Some embodiments may additionally or alternatively include selecting a "room name" attribute from the second set of attributes based on a "room type" attribute from the first set of attributes. For example, if the first set of attributes includes a room type attribute of "bedroom," then a room attribute of "bedroom" is selected from the second set of attributes. In another example, if the first set of attributes includes a player type attribute of "play bar," then a room attribute of "media room" is selected from the second set of attributes. Additional device attributes from the second set of device attributes could also be selected based on one or more of the device attributes in the first set of device attributes.

In some embodiments, after selecting a second device attribute(s) for the playback device from the second set of device attributes used by the second controller application based at least in part on the first device attribute(s) of the first set of device attributes used by the first controller application, the selected second device attribute(s) is/are stored (or perhaps caused to be stored) in the first set of device attributes used by the first controller application to control the playback device.

In some embodiments, storing the selected second device attribute(s) (or causing the selected second device attribute(s) to be stored) in the first set of device attributes used by the first controller application to control the playback device includes one or more of (i) storing the selected second device attribute(s) in the first set of device attributes stored on the computing device that is executing the first controller application; (ii) storing the selected second device attribute(s) in the first set of device attributes stored in a cloud computing system; (iii) storing the selected second device attribute(s) in the first set of device attributes stored on a computing device that is executing the second controller application; and/or (iv) storing the selected second device attribute(s) in the first set of device attributes stored on a computing device that is executing both the first controller application and the second controller application.

In some embodiments, after causing the selected second device attribute to be stored in the first set of device attributes for the playback device, at least one function of the playback device is controlled using the selected second device attribute.

In some embodiments, controlling at least one function of the playback device using the selected second device attribute includes controlling at least one function of the playback device using the selected second device attribute with the first controller application. In some embodiments, controlling at least one function of the playback device using the selected second device attribute includes controlling at least one function of the playback device using the selected second device attribute with the second controller application.

For example, in some embodiments, controlling at least one function of the playback device using the selected second device attribute includes controlling the volume of the playback device via the native controller application provided by the playback device manufacturer. In some embodiments, controlling at least one function of the playback device using the selected second device attribute additionally or alternatively includes controlling the volume of the playback device via a controller application that is not provided by the playback device manufacturer.

In one example, a bedroom has two playback devices configured as a stereo pair of playback devices. The user has a computing device (e.g. a smart phone) running a first controller application (e.g., a native controller application) for controlling the two playback devices. The user's computing device also runs a second controller application (e.g., a smart home controller application) for controlling appliances, such as lights, air conditioning, and blinds, in addition to the playback devices. In operation, the first controller application identifies a set of room types from the second controller application (e.g., bedroom, kitchen, living room, dining room, and so on). And based on the names of the playback devices (e.g., "User's Room Left" and "User's Room Right") in the first controller application, the first controller application infers that the "room type" attribute for the second controller application should be designated as "bedroom."

Next, the "bedroom" designation from the second set of attributes is stored in the first set of attributes in the first controller application. The first controller application may additionally or alternatively send the selected "bedroom" designation to the second controller application where the selected "bedroom" designation is stored with other device attributes for use with controlling the first and second playback devices. In some embodiments, the selected "bedroom" designation from the second set of attributes is stored in a cloud computing system where it can be accessed by one or both of the first controller application and the second controller application.

After causing the selected second device attribute to be stored in the first set of device attributes for the playback device, either (or both) the first or second controller applications can control at least one function of the first or second playback devices in the user's room using the selected "bedroom" designation. For example, the first controller application may receive a command to play a song on all playback devices "in the bedroom." Similarly the second controller application may receive a command to launch a "bedtime scene" that includes (i) setting the lights in the bedroom to a low level, (ii) closing the shades in the bedroom, and (iii) playing music from a playlist of relaxing music via the first and second playback devices in the bedroom.

Figure 14:
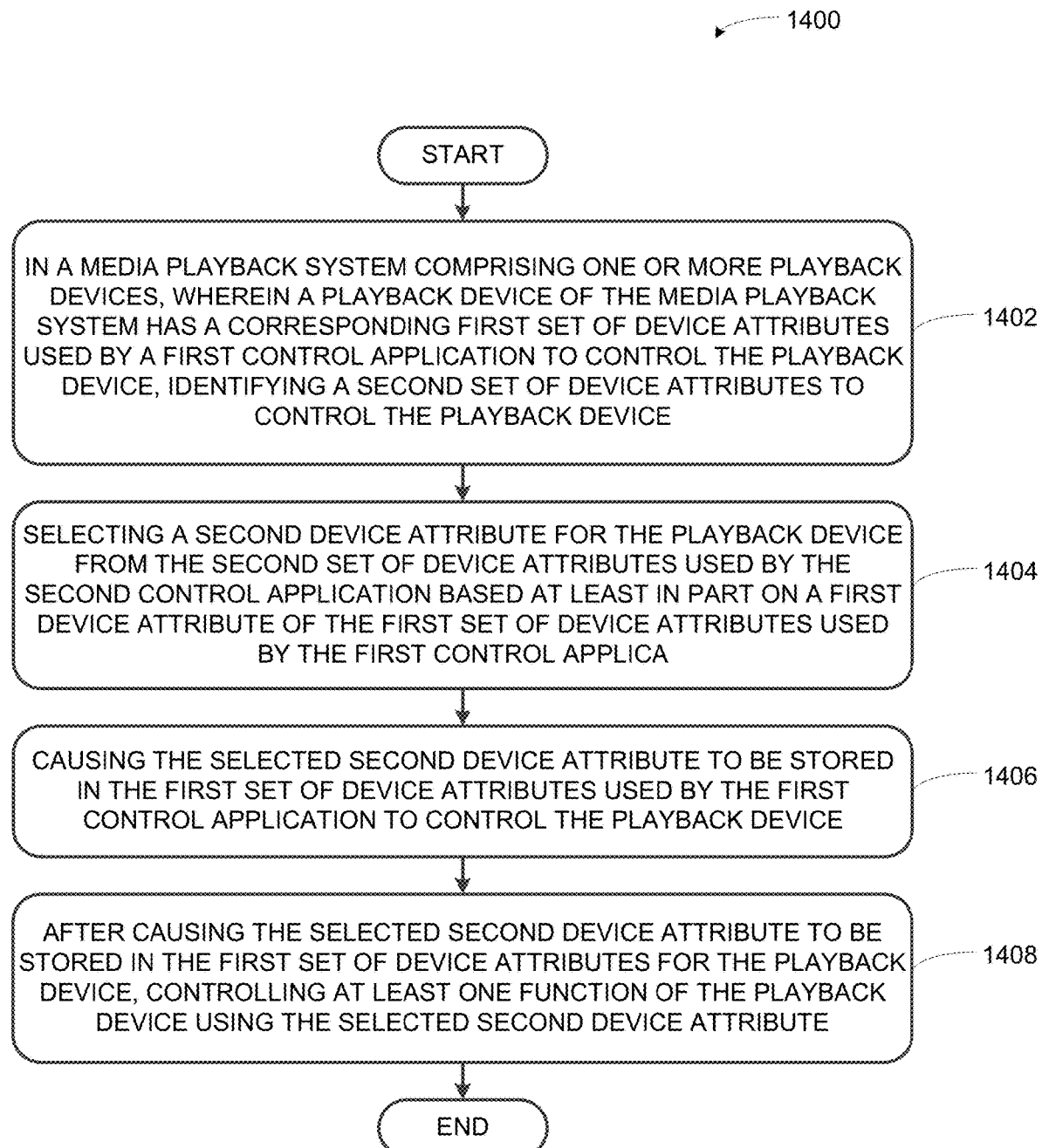
FIG. 14 shows an example method for controlling a media playback device according to some embodiments.

FIG. 14 shows a method 1400 of controlling a playback device in a media playback system according to some embodiments.

Method 1400 begins at block 1402, which includes, in a media playback system comprising one or more playback devices, wherein a playback device of the media playback system has a corresponding first set of device attributes used by a first controller application to control the playback device, identifying a second set of device attributes associated with the playback device. In some embodiments, the second set of device attributes are used by a second controller application to control the playback device.

In some embodiments, identifying a second set of device attributes comprises: (i) receiving the second set of device attributes from one or more of (a) second controller application, (b) a cloud computing system, (c) an application programming interface, and/or (d) a database of device attributes; and (ii) storing the second set of device attributes to control the playback device. In some embodiments, identifying a second set of device attributes used by a second controller application to control the playback device comprises: (i) receiving the second set of device attributes from the second controller application; and (ii) storing the second set of device attributes used by the second controller application to control the playback device.

Next, method 1400 advances to block 1404, which includes selecting a second device attribute for the playback device from the second set of device attributes used by the second controller application based at least in part on a first device attribute of the first set of device attributes used by the first controller application.

In some embodiments, the first device attribute comprises one of a player name, a player type, a player icon, a player configuration, a zone name for a zone associated with the playback device, and a session name for a session associated with the playback device, and the second set of device attributes comprises one or more of a set of room type identifiers and a set of room identifiers. In such embodiments, selecting a second device attribute based at least in part on the first device attribute comprises selecting at least one of a room type identifier from the set of room type identifiers or a room identifier from the set of room identifiers based at least in part on one or more of the player name, the player type, the player icon, the player configuration, the zone name for a zone associated with the playback device, and the session name for a session associated with the playback device. The first and second sets of device attributes could include fewer, additional, and/or different attributes than the ones listed above.

For example, in some embodiments, the first device attribute comprises a player name and the second set of device attributes comprises a set of room type identifiers. In such embodiments, selecting a second device attribute based at least in part on the first device attribute in block 1404 comprises selecting a room type identifier from the set of room type identifiers based at least in part on the player name.

In another example, in some embodiments, the first device attribute comprises a player name and the second set of device attributes comprises a set of room type identifiers. In such embodiments, selecting a second device attribute based at least in part on the first device attribute in block 1404 additionally or alternatively comprises selecting a room type identifier from the set of room type identifiers based at least in part on the player name.

In yet another example, in some embodiments, the first device attribute comprises a player type and the second set of device attributes comprises a set of room type identifiers. In such embodiments, selecting a second device attribute based at least in part on the first device attribute in block 1404 additionally or alternatively comprises selecting a room type identifier from the set of room type identifiers based at least in part on the player type.

In a further example, in some embodiments, the first device attribute comprises a player icon and the second set of device attributes comprises a set of room type identifiers.

In such embodiments, selecting a second device attribute based at least in part on the first device attribute in block 1404 additionally or alternatively comprises selecting a room type identifier from the set of room type identifiers based at least in part on the player icon.

In yet a further example, in some embodiments, the first device attribute comprises a player configuration and the second set of device attributes comprises a set of room type identifiers. In such embodiments, selecting a second device attribute based at least in part on the first device attribute in block 1404 additionally or alternatively comprises selecting a room type identifier from the set of room type identifiers based at least in part on the player configuration.

In another example, in some embodiments, the first device attribute comprises a zone name for a zone associated with the playback device (or perhaps a zone in which the playback device is located or is a member of) and the second set of device attributes comprises a set of room type identifiers. In such embodiments, selecting a second device attribute based at least in part on the first device attribute in block 1404 additionally or alternatively comprises selecting a room type identifier from the set of room type identifiers based at least in part on the zone name.

In yet another example, in some embodiments, the first device attribute comprises a session name for a session associated with the playback device and the second set of device attributes comprises a set of room type identifiers. In such embodiments, selecting a second device attribute based at least in part on the first device attribute in block 1404 additionally or alternatively comprises selecting a room type identifier from the set of room type identifiers based at least in part on the session name.

In still another example, in some embodiments, the first device attribute comprises a room type and the second set of device attributes additionally or alternatively comprises a set of room identifiers. In such embodiments, selecting a second device attribute based at least in part on the first device attribute in block 1404 additionally or alternatively comprises selecting a room identifier from the set of room identifiers based at least in part on the room type.

In a further example, in some embodiments, the first device attribute comprises a player name and the second set of device attributes comprises a set of room identifiers. In such embodiments, selecting a second device attribute based at least in part on the first device attribute in block 1404 additionally or alternatively comprises selecting a room identifier from the set of room identifiers based at least in part on the player name.

In another example, in some embodiments, the first device attribute comprises a player type and the second set of device attributes comprises a set of room identifiers. In such embodiments, selecting a second device attribute based at least in part on the first device attribute in block 1404 additionally or alternatively comprises selecting a room identifier from the set of room identifiers based at least in part on the player type.

In another example, in some embodiments, the first device attribute comprises a player icon and the second set of device attributes comprises a set of room identifiers. In such embodiments, selecting a second device attribute based at least in part on the first device attribute in block 1404 additionally or alternatively comprises selecting a room identifier from the set of room identifiers based at least in part on the player icon.

In a further example, in some embodiments, the first device attribute comprises a player configuration and the second set of device attributes comprises a set of room identifiers. In such embodiments, selecting a second device attribute based at least in part on the first device attribute in block 1404 additionally or alternatively comprises selecting a room identifier from the set of room identifiers based at least in part on the player configuration.

Next, method 1400 advances to block 1406, which includes causing the selected second device attribute to be stored in the first set of device attributes used by the first controller application to control the playback device. In some embodiments, causing the selected second device attribute to be stored in the first set of device attributes used by the first controller application to control the playback device comprises the computing device writing the selected second device attribute to a file stored on the playback device. In some embodiments, causing the selected second device attribute to be stored in the first set of device attributes used by the first controller application to control the playback device additionally or alternatively comprises the computing device writing the selected second device attribute to a file stored on the computing device and perhaps one or more additional computing devices. In some embodiments, causing the selected second device attribute to be stored in the first set of device attributes used by the first controller application to control the playback device additionally or alternatively comprises the computing device sending the selected second device attribute to a cloud server for storage in a cloud computing system.

Next, method 1400 advances to block 1408, which includes after causing the selected second device attribute to be stored in the first set of device attributes for the playback device, controlling at least one function of the playback device using the selected second device attribute.

In some embodiments, the first controller application is a controller application provided by a manufacturer of the media playback system comprising one or more playback devices, and the second controller application is a controller application that is not provided by the manufacturer of the media playback system comprising one or more playback devices. In some embodiments, controlling at least one function of the playback device using the selected second device attribute comprises controlling at least one function of the playback device using the selected second device attribute with the first controller application. In some embodiments, controlling at least one function of the playback device using the selected second device attribute comprises additionally or alternatively controlling at least one function of the playback device using the selected second device attribute with the second controller application.

In some embodiments, method 1400 additionally comprises: (i) identifying a third set of device attributes used by a third controller application to control the playback device; (ii) selecting a third device attribute for the playback device from the third set of device attributes used by the third controller application based at least in part on a first device attribute of the first set of device attributes used by the first controller application; (iii) causing the selected third device attribute to be stored in the first set of device attributes used by the first controller application to control the playback device; and (iv) after causing the selected second device attribute to be stored in the first set of device attributes for the playback device, controlling at least one function of the playback device using the selected third device attribute with one or more of the first controller application, the second controller application, or the third controller application.

In such embodiments, the first controller application is a controller application provided by a manufacturer of the media playback system comprising one or more playback devices, and the second controller application and third controller application are controller applications not provided by the manufacturer of the media playback system comprising one or more playback devices.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture. The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. Tangible, non-transitory computer-readable media comprising instructions stored therein, wherein the instructions, when executed by one or more processors, cause a computing device to perform a method comprising:

in a media playback system comprising one or more playback devices, wherein a playback device of the media playback system has a corresponding first set of device attributes used by a first controller application to identify and control the playback device, identifying a second set of device attributes used by a second controller application to identify and control the playback device;

selecting a second device attribute for the playback device from the second set of device attributes used by the second controller application based at least in part on a first device attribute of the first set of device attributes used by the first controller application, wherein the second set of device attributes comprises a set of room type identifiers, and wherein selecting the second device attribute based at least in part on the first device attribute comprises selecting a room type identifier from the set of room type identifiers;

causing the selected second device attribute to be stored in the first set of device attributes used by the first controller application to control the playback device; and after causing the selected second device attribute to be stored in the first set of device attributes for the playback device, controlling at least one function of the playback device using the selected second device attribute.

2. The tangible, non-transitory computer-readable media of claim 1, wherein controlling at least one function of the playback device using the selected second device attribute comprises controlling at least one function of the playback device using the selected second device attribute with the first controller application.

3. The tangible, non-transitory computer-readable media of claim 1, wherein controlling at least one function of the playback device using the selected second device attribute comprises controlling at least one function of the playback device using the selected second device attribute with the second controller application.

4. The tangible, non-transitory computer-readable media of claim 1, wherein identifying a second set of device attributes used by a second controller application to control the playback device comprises:

receiving the second set of device attributes from one or more of the second controller application, a cloud computing system, and/or an application programming interface; and storing the second set of device attributes used by the second controller application to control the playback device.

5. The tangible, non-transitory computer-readable media of claim 1, wherein the first device attribute comprises a player name, and wherein selecting the second device attribute based at least in part on the first device attribute comprises selecting the room type identifier from the set of room type identifiers based at least in part on the player name.

6. The tangible, non-transitory computer-readable media of claim 1, wherein the first device attribute comprises a player type, and wherein selecting the second device attribute based at least in part on the first device attribute comprises selecting the room type identifier from the set of room type identifiers based at least in part on the player type.

7. The tangible, non-transitory computer-readable media of claim 1, wherein the first device attribute comprises a player icon, and wherein selecting the second device attribute based at least in part on the first device attribute comprises selecting the room type identifier from the set of room type identifiers based at least in part on the player icon.

8. The tangible, non-transitory computer-readable media of claim 1, wherein the first device attribute comprises a player configuration, and wherein selecting the second device attribute based at least in part on the first device attribute comprises selecting the room type identifier from the set of room type identifiers based at least in part on the player configuration.

9. The tangible, non-transitory computer-readable media of claim 1, wherein the first device attribute comprises a zone name for a zone associated with the playback device, and wherein selecting the second device attribute based at least in part on the first device attribute comprises selecting the room type identifier from the set of room type identifiers based at least in part on the zone name.

10. The tangible, non-transitory computer-readable media of claim 1, wherein the first device attribute comprises a session name for a session associated with the playback device, and wherein selecting the second device attribute based at least in part on the first device attribute comprises selecting the room type identifier from the set of room type identifiers based at least in part on the session name.

11. The tangible, non-transitory computer-readable media of claim 1, wherein causing the selected second device attribute to be stored in the first set of device attributes used by the first controller application to control the playback device comprises the computing device writing the selected second device attribute to one or more files stored on one or more of the playback device or a cloud computing system server.

12. The tangible, non-transitory computer-readable media of claim 1, further comprising:
displaying, via a graphical user interface, one or more attributes from the first set of device attributes or the second set of device attributes in a user interface menu;
receiving, via the graphical user interface, a selection of one of the displayed device attributes associated with the playback device; and
sending a command to the playback device based at least in part on the received selection of the one of the displayed device attributes associated with the playback device.

13. The tangible, non-transitory computer-readable media of claim 1, wherein the method further comprises:
identifying a third set of device attributes used by a third controller application to control the playback device;
selecting a third device attribute for the playback device from the third set of device attributes used by the third controller application based at least in part on a first device attribute of the first set of device attributes used by the first controller application;
causing the selected third device attribute to be stored in the first set of device attributes used by the first controller application to control the playback device; and
after causing the selected second device attribute to be stored in the first set of device attributes for the playback device, controlling at least one function of the playback device using the selected third device attribute with one or more of the first controller application, the second controller application, or the third controller application.

14. A method comprising:
in a media playback system comprising one or more playback devices, wherein a playback device of the media playback system has a corresponding first set of device attributes used by a first controller application to identify and control the playback device, identifying a second set of device attributes used by a second controller application to identify and control the playback device;
selecting a second device attribute for the playback device from the second set of device attributes used by the second controller application based at least in part on a first device attribute of the first set of device attributes used by the first controller application, wherein the second set of device attributes comprises one of: (a) a set of room type identifiers or (b) a set of room identifiers, and wherein selecting the second device attribute based at least in part on the first device attribute comprises selecting one of: (a) a room type identifier from the set of room type identifiers or (b) a room identifier from the set of room identifiers;
causing the selected second device attribute to be stored in the first set of device attributes used by the first controller application to control the playback device; and
after causing the selected second device attribute to be stored in the first set of device attributes for the playback device, controlling at least one function of the playback device using the selected second device attribute by at least one of the first controller application or the second controller application.

15. The method of claim 14, wherein the first device attribute comprises one of a player name, a player type, a player icon, a player configuration, a zone name for a zone associated with the playback device, and a session name for a session associated with the playback device, and wherein selecting the second device attribute based at least in part on the first device attribute comprises selecting at least one room type identifier from the set of room type identifiers or room identifier from the set of room identifiers based at least in part on one or more of the player name, the player type, the player icon, the player configuration, the zone name for a zone associated with the playback device, and the session name for a session associated with the playback device.

16. Tangible, non-transitory computer-readable media comprising instructions stored therein, wherein the instructions, when executed by one or more processors, cause a computing device to perform a method comprising:
in a media playback system comprising one or more playback devices, wherein a playback device of the media playback system has a corresponding first set of device attributes used by a first controller application to identify and control the playback device, identifying a second set of device attributes used by a second controller application to identify and control the playback device;
selecting a second device attribute for the playback device from the second set of device attributes used by the second controller application based at least in part on a first device attribute of the first set of device attributes used by the first controller application, wherein the second set of device attributes comprises a set of room identifiers, and wherein selecting the second device attribute based at least in part on the first device attribute comprises selecting a room identifier from the set of room identifiers;

causing the selected second device attribute to be stored in the first set of device attributes used by the first controller application to control the playback device; and after causing the selected second device attribute to be stored in the first set of device attributes for the playback device, controlling at least one function of the playback device using the selected second device attribute.

17. The tangible, non-transitory computer-readable media of claim 16, wherein the first device attribute comprises a room type, and wherein selecting the second device attribute based at least in part on the first device attribute comprises selecting the room identifier from the set of room identifiers based at least in part on the room type.

18. The tangible, non-transitory computer-readable media of claim 16, wherein the first device attribute comprises a player name, and wherein selecting the second device attribute based at least in part on the first device attribute comprises selecting the room identifier from the set of room identifiers based at least in part on the player name.

19. The tangible, non-transitory computer-readable media of claim 16, wherein the first device attribute comprises a player type, and wherein selecting the second device attribute based at least in part on the first device attribute comprises selecting the room identifier from the set of room identifiers based at least in part on the player type.

20. The tangible, non-transitory computer-readable media of claim 16, wherein the first device attribute comprises a player icon, and wherein selecting the second device attribute based at least in part on the first device attribute comprises selecting the room identifier from the set of room identifiers based at least in part on the player icon.

21. The tangible, non-transitory computer-readable media of claim 16, wherein the first device attribute comprises a player configuration, and wherein selecting the second device attribute based at least in part on the first device attribute comprises selecting the room identifier from the set of room identifiers based at least in part on the player configuration.

* * * * *